US009118917B2

(12) United States Patent
Sakai et al.

(10) Patent No.: US 9,118,917 B2
(45) Date of Patent: Aug. 25, 2015

(54) IMAGE CODING METHOD, IMAGE CODING APPARATUS, AND IMAGING SYSTEM

(75) Inventors: Megumi Sakai, Osaka (JP); Toshihiko Kusakabe, Osaka (JP); Shinji Kitamura, Kyoto (JP); Yasuharu Tanaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 566 days.

(21) Appl. No.: 13/569,885

(22) Filed: Aug. 8, 2012

(65) Prior Publication Data

US 2012/0300098 A1 Nov. 29, 2012

Related U.S. Application Data

(63) Continuation of application No. PCT/JP2011/000195, filed on Jan. 17, 2011.

(30) Foreign Application Priority Data

Feb. 19, 2010 (JP) ................................. 2010-035138

(51) Int. Cl.
*H04N 19/14* (2014.01)
*H04N 19/176* (2014.01)
*H04N 19/122* (2014.01)
*H04N 19/61* (2014.01)

(52) U.S. Cl.
CPC ............. *H04N 19/14* (2014.11); *H04N 19/122* (2014.11); *H04N 19/176* (2014.11); *H04N 19/61* (2014.11)

(58) Field of Classification Search
CPC ..................................................... H04N 19/14
See application file for complete search history.

(56) References Cited

U.S. PATENT DOCUMENTS

| 5,613,015 | A | 3/1997 | Suzuki et al. |
| 5,649,025 | A * | 7/1997 | Revankar ..................... 382/171 |
| 6,026,177 | A * | 2/2000 | Mong et al. ................... 382/156 |
| 6,750,984 | B1 | 6/2004 | Kanata et al. |
| 2003/0142866 | A1* | 7/2003 | Zuniga ......................... 382/171 |
| 2010/0254448 | A1* | 10/2010 | Xu et al. ................... 375/240.02 |
| 2011/0222792 | A1 | 9/2011 | Kusakabe |

FOREIGN PATENT DOCUMENTS

| JP | 05-003542 A | 1/1993 |
| JP | 06-164939 A | 6/1994 |
| JP | 2000-236441 A | 8/2000 |
| JP | 2001-008036 A | 1/2001 |
| JP | 2004-064532 A | 2/2004 |
| JP | 2007-081794 A | 3/2007 |
| JP | 2007-110568 A | 4/2007 |
| JP | 2008-004983 A | 1/2008 |
| WO | WO-2010/050106 A1 | 5/2010 |

OTHER PUBLICATIONS

International Search Report mailed Mar. 8, 2011 issued in corresponding International Application No. PCT/JP2011/000195.

* cited by examiner

*Primary Examiner* — Sath V Perungavoor
*Assistant Examiner* — James Pontius
(74) *Attorney, Agent, or Firm* — McDermott Will & Emery LLP

(57) ABSTRACT

The image coding method according to the present invention includes the following steps. At a histogram calculation step, a histogram of pixel values included in a block image is calculated. At a plane region detection step, a size of a plane region included in the block image is detected. At an orthogonal transformation size selection step, (i) a first processing size is selected as a processing size of orthogonal transformation for the block image when the histogram is bimodal and the size of the plane region is equal to or greater than the first threshold value, and (ii) a second processing size greater than the first processing size is selected as the processing size, when that the histogram is not bimodal or the size of the plane region is smaller than the first threshold value.

17 Claims, 17 Drawing Sheets

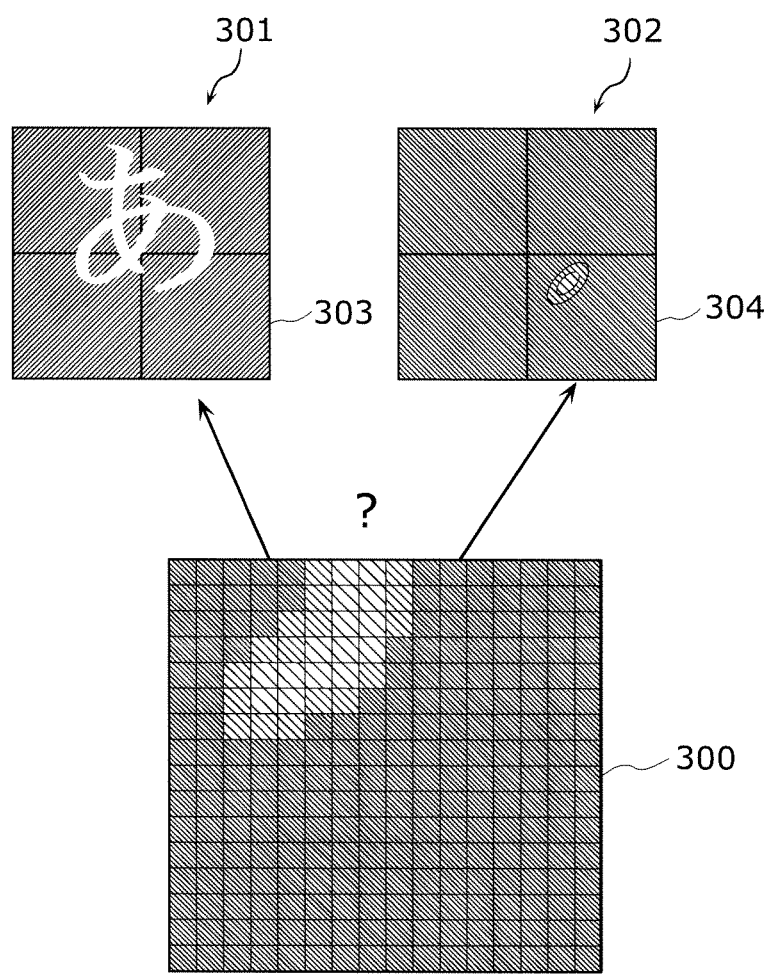

IMAGE CODING METHOD, IMAGE CODING APPARATUS, AND IMAGING SYSTEM

CROSS REFERENCE TO RELATED APPLICATION(S)

This is a continuation application of PCT Patent Application No. PCT/JP2011/000195 filed on Jan. 17, 2011, designating the United States of America, which is based on and claims priority of Japanese Patent Application No. 2010-035138 filed on Feb. 19, 2010. The entire disclosures of the above-identified applications, including the specifications, drawings and claims are incorporated herein by reference in their entirety.

TECHNICAL FIELD

The present invention relates to image coding methods, image coding devices, and imaging systems, and more particularly to an image coding method of selecting a processing size in orthogonal transformation on a block-by-block basis and coding each block having the selected processing size.

BACKGROUND ART

As one of standard technologies of coding video data, there is MPEG-4 Part 10: Advanced Video Coding (simply as MPEG-4 AVC) defined by Moving Picture Experts Group (MPEG) of ISO/IEC JTC1. In this MPEG-4 AVC, it is possible to select, as a block size for orthogonal transformation, an orthogonal transformation size of 4 pixels×4 pixels or an orthogonal transformation size of 8 pixels×8 pixels.

In the case of using the orthogonal transformation size of 4 pixels×4 pixels, an area where block noise and mosquito noise are diffused is smaller, so that such noise is hardly observed. However, since frequency resolution is lower, it is a possibility of decreasing coding efficiency in images with high correlation in a wide range. Therefore, the orthogonal transformation size of 4 pixels×4 pixels is selected only for portions where edges such as character portions are sharp and mosquito noise is likely to occur, while the orthogonal transformation size of 8 pixels×8 pixels is selected for portions having high correlation such as natural image. As a result, it is possible to improve image quality while suppressing the decrease of coding efficiency.

Patent Literature 1 explains a method of switching an orthogonal transformation size to another, by detecting an edge in a block.

By the orthogonal transformation size selection method disclosed in Patent Literature 1, an edge is detected from a target block and it is determined based on the number of detected edges whether or not there is an edge. Furthermore, by the orthogonal transformation size selection method disclosed in Patent Literature 1, the orthogonal transformation size of 4 pixels×4 pixels is selected if a determination is made that there is an edge, while the orthogonal transformation size of 8 pixels×8 pixels is selected if a determination is made that there is no edge. Moreover, in the disclosure of Patent Literature 1, as the edge detection method, a method using a difference among adjacent pixels is described.

In addition, Patent Literature 2 discloses a method of calculating a luminance histogram in a block and determining whether or not the block includes an image of character (hereinafter, referred to simply as a "character"). Here, a luminance histogram of a natural image shows monomodal distribution having a single mountain (crest). Furthermore, if there is a character in the block, the luminance histogram of the image shows bimodal distribution having two mountains. Based on such distribution characteristics, in Patent Literature 2, it is determined that the block includes a character if the luminance histogram in the block shows bimodal distribution, while it is determined that the block does not include any character if the luminance histogram in the block does not show bimodal distribution.

CITATION LIST

Patent Literature

[PTL 1] Japanese Unexamined Patent Application No. 2007-110568
[PTL 2] Japanese Unexamined Patent Application No. 06-164939

SUMMARY OF INVENTION

Technical Problem

However, the edge detection based on an adjacent pixel difference which is disclosed in Patent Literature 1 has a problem of a low accuracy in detecting character portions. Each of FIGS. 17A and 17B shows an example of a result of the orthogonal transformation size selection using the edge detection. In each of FIGS. 17A and 17B, each block 390 surrounded by a thin line is a block for which the orthogonal transformation size of 8 pixels×8 pixels is selected. Each block 391 surrounded by a thick line is a block for which the orthogonal transformation size of 4 pixels×4 pixels is selected.

Furthermore, FIG. 17A shows the case where an edge detection threshold value is set to be small so as to select all blocks including a character. As shown in FIG. 17A, the orthogonal transformation size of 4 pixels×4 pixels is selected not only for the character portion but also for a large number of blocks including images of leaves. As a result, coding efficiency is decreased.

FIG. 17B shows an example of a result of the orthogonal conversion size selection in the case where the threshold value is set to be greater so as to reduce blocks for which the orthogonal transformation size of 4 pixels×4 pixels is to be selected. In FIG. 17B, the orthogonal transformation size of 4 pixels×4 pixels is not selected for blocks each including only a part of a character. However, the orthogonal transformation size of 4 pixels×4 pixels is wrongly selected for the blocks including leaves.

If a method of determining a character based on the histogram disclosed in Patent Literature 2 is applied to the orthogonal transformation size selection, the blocks including leaves are unlikely to be selected in comparison to the case of the edge detection. However, also in a natural image, a luminance difference is large at a boundary between objects. Therefore, even in the case using the method disclosed in Patent Literature 2, it is wrongly determined that a boundary between objects in a natural image is a character portion.

As explained above, the conventional techniques have problems of failing to detect blocks including a character at a high accuracy.

Thus, the present invention overcomes the problems of the conventional techniques as described above. One non-limiting and exemplary embodiment provides an image coding method and an image coding device which are able to detect a block including an image of a character at a high accuracy.

Solution to Problem

In one general aspect, the techniques disclosed here feature; An image coding method of selecting a processing size of orthogonal transformation on a block-by-block basis and coding a target block by the selected processing size, the image coding method comprising: calculating a histogram of pixel values included in a first target block included in an original image; determining whether or not the calculated histogram is bimodal; detecting a size of a plane region included in the first target block; determining whether or not the detected size of the plane region is equal to or greater than a first threshold value; and selecting, as the processing size of the orthogonal transformation for the first target block, (i) a first processing size when it is determined that the histogram is bimodal and it is determined that the size of the plane region is equal to or greater than the first threshold value, and (ii) a second processing size greater than the first processing size when it is determined that the histogram is not bimodal or it is determined that the size of the plane region is smaller than the first threshold value.

Thereby, the image coding method according to the aspect of the present invention determines the processing size of the orthogonal transformation in consideration with existence (size) of a plane region in addition to existence of bimodal distribution of the histogram. As a result, the image coding method according to the aspect of the present invention can detect a block including a character at a high accuracy.

It is possible that the detecting includes: (i) calculating, for each pair of pixels included in the first target block, an absolute differential value between a target pixel and each of adjacent pixels which are horizontally and vertically adjacent to the target pixel; and (ii) detecting, as the size of the plane region, a count of plane parts each having the absolute differential value smaller than a second threshold value.

It is further possible that the image coding method further includes: storing selection information indicating which of the first processing size and the second processing size is selected for the first target block; and controlling the selecting so that the first processing size is more likely to be selected for a second target block than the second processing size, when the stored selection information of a neighbor block of the second target block indicates that the first processing size is selected for the neighbor block.

Thereby, the image coding method according to the aspect of the present invention is able to determine the processing size for the target block in consideration with a processing size of orthogonal transformation which is selected for a neighbor block of the target block. As a result, the image coding method according to the aspect of the present invention can detect a block including a character at a high accuracy.

It is still further possible that in the controlling, the selecting is controlled so that the second processing size is more likely to be selected than the first processing size, when the stored selection information of the neighbor block of the second target block indicates that the second processing size is selected for the neighbor block.

It is still further possible that the determining regarding the histogram includes: (i) detecting a mountain when a frequency difference between classes of the histogram is equal to or greater than a third threshold value; and (ii) determining that the histogram is bimodal when two or more mountains are detected.

It is still further possible that the controlling includes, when the selection information indicates that the first processing size is selected, decreasing the third threshold value to control the selecting so that the first processing size is more likely to be selected than the second processing size.

It is still further possible that the image coding method further includes: determining whether or not the first target block includes a character part, wherein (i) it is determined that the first target block includes the character part, when it is determined that the histogram is bimodal and it is determined that the size of the plane region is equal to or greater than the first threshold value, and (ii) it is determined that the first target block does not include the character part, when it is determined that the histogram is not bimodal or it is determined that the size of the plane region is smaller than the first threshold value; and storing character determination information indicating whether or not it is determined that the first target block includes the character part, wherein in the selecting, (i) the first processing size is selected as the processing size of the orthogonal transformation for the first target block, when it is determined that the first target block includes the character part; and (ii) the second processing size is selected as the processing size of the orthogonal transformation for the first target block, when it is determined that the first target block does not include the character part, wherein the image coding method further comprises controlling the selecting so that the first processing size is likely to be selected for a second target block, when the stored character determination information of a neighbor block of the second target block indicates that the neighbor block includes the character part.

It is still further possible that the neighbor block is at least one of eight blocks adjacent to the second target block.

It is still further possible that the neighbor block is co-located in a previous picture.

It is still further possible that in the calculating of the histogram, a histogram of luminance values of the first target block is calculated as the histogram.

It is still further possible that in the calculating of the histogram, a histogram of chrominance of the first target block is calculated as the histogram.

It is still further possible that the first processing size is 4 pixels×4 pixels, and the second processing size is 8 pixels×8 pixels.

It should be noted that the present invention can be implemented not only as the above-described image coding method, but also as: an image coding device including units performing the characteristic steps included in the image coding method. It should be noted that the present invention can be implemented also as a program causing a computer to execute the characteristic steps included in the image coding method. Of course, the program can be distributed via a recording medium such as a Compact Disc-Read Only Memory (CD-ROM) or via a transmission medium such as the Internet.

It should also be noted that a part or all of functions in the image coding device may be implemented into a Large Scale Integration (LSI), or the present invention may be implemented as an imaging system including the image coding device.

Advantageous Effects of Invention

Accordingly, the present invention can provide an image coding method and an image coding device which are able to detect a block including an image of a character at a high accuracy.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 14 is a diagram showing an example of blocks for which threshold value setting is difficult, according to Embodiment 1 of the present invention;

DESCRIPTION OF EMBODIMENTS

The following describes embodiments of the present invention with reference to the drawings.

Embodiment 1

The image coding device according to Embodiment 1 of the present invention determines a processing size in orthogonal transformation in consideration of existence of a plane region as well as existence of bimodal distribution in a histogram. Thereby, the image coding device according to Embodiment 1 of the present invention can detect, at a high accuracy, a block including an image of a character.

First, the structure of the image coding device 100 according to Embodiment 1 of the present invention is described.

Figure 1:
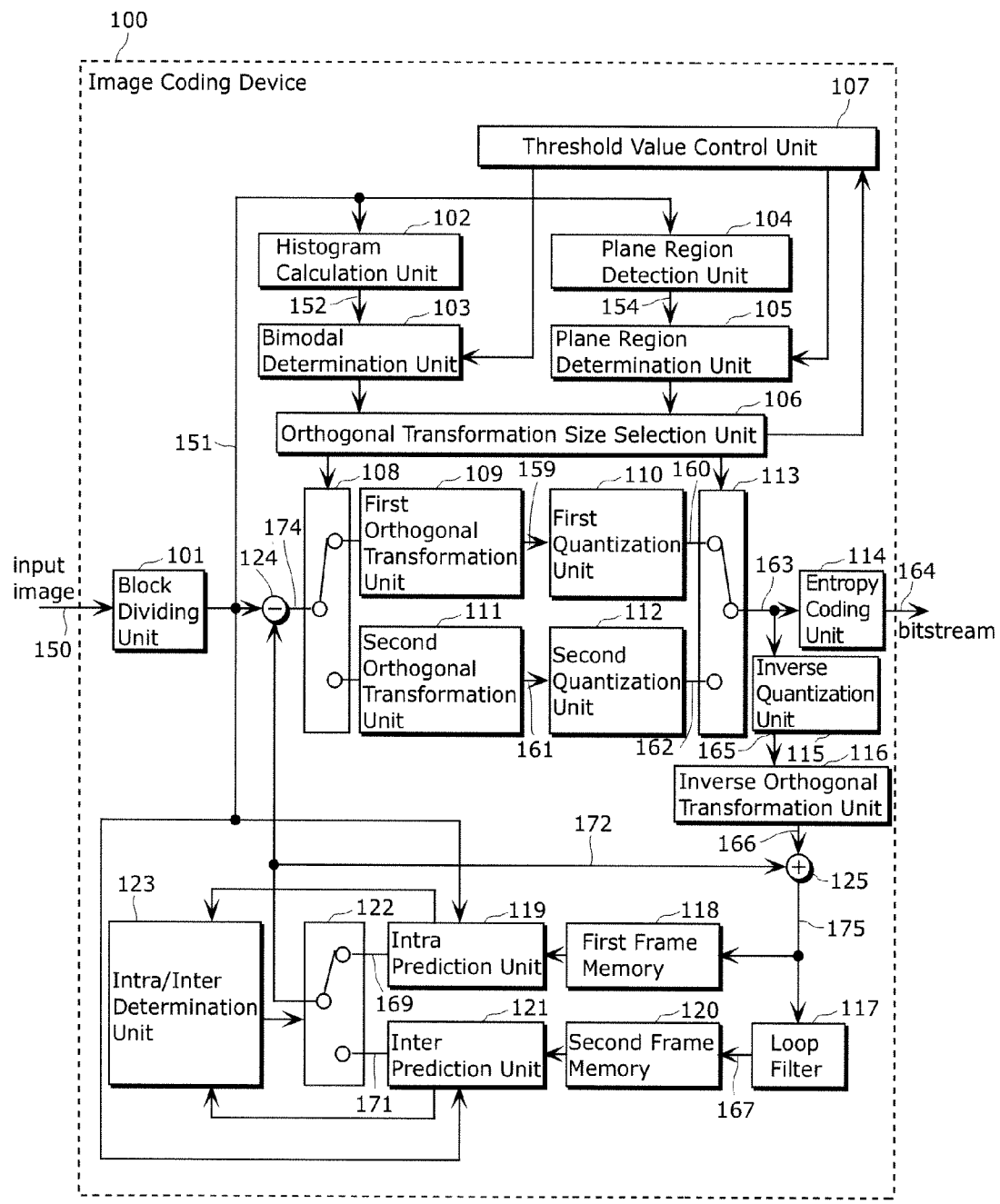
FIG. 1 is a block diagram showing an image coding device according to Embodiment 1 of the present invention.

FIG. 1 is a block diagram showing the structure of the image coding device 100 according to Embodiment 1 of the present invention.

The image coding device 100 according to Embodiment 1 codes an input image 150 on a block-by-block basis to generate a bitstream 164. Here, the image coding device selects a processing size in orthogonal transformation for each block to code the block by the selected processing size.

The image coding device 100 includes a block dividing unit 101, a histogram calculation unit 102, a bimodal determination unit 103, a plane region detection unit 104, a plane region determination unit 105, an orthogonal transformation size selection unit 106, a threshold value control unit 107, a selector 108, a first orthogonal transformation unit 109, a first quantization unit 110, a second orthogonal transformation unit 111, a second quantization unit 112, a selector 113, an entropy coding unit 114, an inverse quantization unit 115, an inverse orthogonal transformation unit 116, a loop filter 117, a first frame memory 118, an intra prediction unit 119, a second frame memory 120, an inter prediction unit 121, a selector 122, and an intra/inter determination unit 123.

The block dividing unit 101 divides the input image 150, which is an original image, into block images 151.

The subtractor 124 calculates a differential image 174 that is a difference between a target block image 151 and a prediction image 172 described later.

The histogram calculation unit 102 calculates a histogram 152 of pixel values included in the block image 151 generated by the block dividing unit 101.

The bimodal determination unit 103 determines whether or not the histogram 152 calculated by the histogram calculation unit 102 is bimodal.

The plane region detection unit 104 detects a size of a plane region in the block image 151 generated by the block dividing unit 101 to generate plane region information 154 indicating the detection result.

The plane region determination unit 105 determines, based on the plane region information 154 generated by the plane region detection unit 104, whether or not the block image 151 includes a plane region. More specifically, the plane region determination unit 105 determines whether or not the size of the plane region detected by the plane region detection unit 104 is equal to or greater than a first threshold value. If it is determined that the size of the plane region is equal to or greater than the first threshold value, the plane region determination unit 105 determines that the target block image 151 includes a plane region. On the other hand, if it is determined that the size of the plane region is smaller than the first threshold value, the plane region determination unit 105 determines that the target block image 151 does not include a plane region.

The orthogonal transformation size selection unit 106 selects a processing size in orthogonal transformation (hereinafter, referred to as an "orthogonal transformation size") based on the determination results of the bimodal determination unit 103 and the plane region determination unit 105.

More specifically, if the bimodal determination unit 103 determines that the histogram 152 is bimodal and the plane region determination unit 105 determines that the target block image 151 includes a plane region, the orthogonal transformation size selection unit 106 selects a size of 4 pixels×4 pixels as the orthogonal transformation size for the target block image 151. On the other hand, if the bimodal determination unit 103 determines that the histogram 152 is not bimodal or the plane region determination unit 105 determines that the target block image 151 does not include a plane region, the orthogonal transformation size selection unit 106 selects a size of 8 pixels×8 pixels as the orthogonal transformation size for the target block image 151.

The threshold value control unit 107 stores the selection result of the orthogonal transformation size selection unit 106. In addition, the threshold value control unit 107 controls threshold values for the bimodal determination unit 103 and the plane region determination unit 105 in accordance with the stored selection result.

The selector 108 switches between orthogonal transformation by an orthogonal transformation size of 4 pixels×4 pixels (hereinafter, referred to as "4 pixels×4 pixels orthogonal transformation") and orthogonal transformation by an orthogonal transformation size of 8 pixels×8 pixels (hereinafter, referred to as "8 pixels×8 pixels orthogonal transformation"), in accordance with instructions from the orthogonal transformation size selection unit 106. More specifically, if the orthogonal transformation size selection unit 106 selects the 4 pixels×4 pixels orthogonal transformation size (hereinafter, referred to as a "4 pixels×4 pixels size"), the selector 108 provides the differential image 174 to the first orthogonal transformation unit 109. On the other hand, if the orthogonal transformation size selection unit 106 selects the 8 pixels×8 pixels orthogonal transformation size (hereinafter, referred to as a "8 pixels×8 pixels size"), the selector 108 provides the differential image 174 to the second orthogonal transformation unit 111.

The first orthogonal transformation unit 109 performs 4 pixels×4 pixels orthogonal transformation on the differential image 174 to generate a transform coefficient 159.

The first quantization unit 110 quantizes the transform coefficient 159 generated by the first orthogonal transformation unit 109 to generate a quantization coefficient 160.

The second orthogonal transformation unit 111 performs 8 pixels×8 pixels orthogonal transformation on the differential image 174 to generate a transform coefficient 161.

The second quantization unit 112 quantizes the transform coefficient 161 generated by the second orthogonal transformation unit 111 to generate a quantization coefficient 162.

In accordance to the instructions from the orthogonal transformation size selection unit 106, the selector 113 selects one of the quantization coefficient 160 and the quantization coefficient 162 to be outputted as a quantization coefficient 163. More specifically, if the orthogonal transformation size selection unit 106 selects the 4 pixels×4 pixels size, the selector 113 outputs the quantization coefficient 160 as the quantization coefficient 163. On the other hand, if the orthogonal transformation size selection unit 106 selects the 8 pixels×8 pixels size, the selector 113 outputs the quantization coefficient 162 as the quantization coefficient 163.

The entropy coding unit 114 codes the quantization coefficient 163 provided from the selector 113 to generate a bitstream 164.

The inverse quantization unit 115 inversely quantizes the quantization coefficient 163 provided from the selector 113 to generate a transform coefficient 165.

The inverse orthogonal transformation unit 116 performs inverse orthogonal transformation on the transform coefficient 165 generated by the inverse quantization unit 115 to generate a differential image 166.

The adder 125 sums the differential image 166 generated by the inverse orthogonal transformation unit 116 and the prediction image 172 to generate a decoded image 175.

The first frame memory 118 stores the decoded image 175.

The intra prediction unit 119 performs intra prediction on pixels included in the decoded image 175 stored in the first frame memory 118 so as to generate a prediction image 169.

The loop filter 117 performs deblocking filtering on the decoded image 175 to generate a decoded image 167.

The second frame memory 120 stores the decoded image 167 for which deblocking filtering has been performed in the loop filter 117.

The inter prediction unit 121 performs inter-picture prediction with reference to the decoded image 167 stored in the second frame memory 120 so as to generate a prediction image 171.

The intra/inter determination unit 123 performs intra/inter determination to determine which of an intra mode or an inter mode is to be used, based on the information obtained by the intra prediction unit 119 and the information obtained by the inter prediction unit 121.

If the intra/inter determination unit 123 determines to use the intra prediction, the selector 122 selects the prediction image 169. On the other hand, if the intra/inter determination unit 123 determines to use the inter prediction, the selector 122 selects the prediction image 171. Then, the selector 122 outputs the selected prediction image 169 or 171 as a prediction image 172.

Next, an image coding method performed by the image coding device 100 according to Embodiment 1 of the present invention is described.

Figure 2:
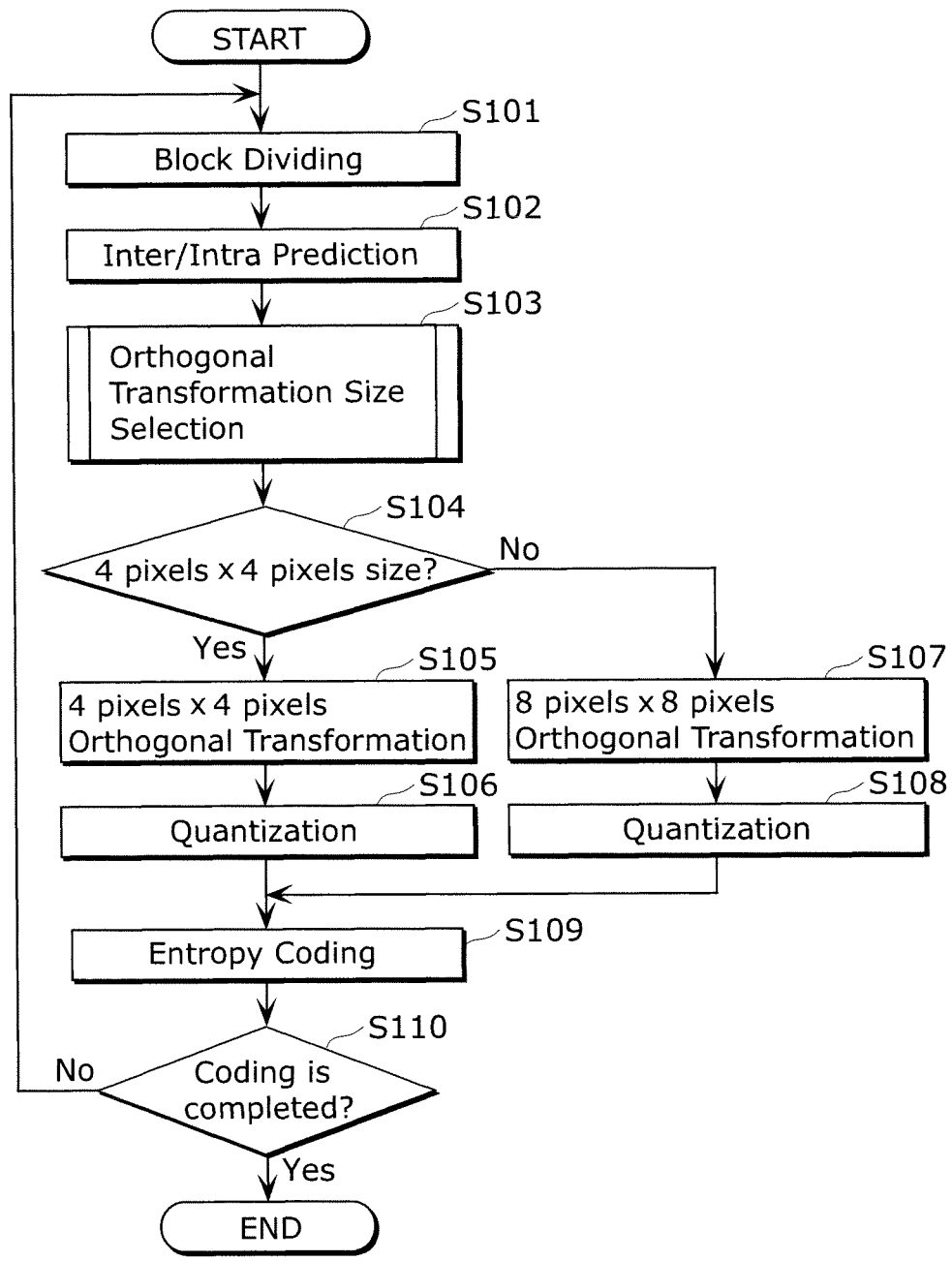
FIG. 2 is a flowchart of an image coding method according to Embodiment 1 of the present invention.

FIG. 2 is a flowchart of the image coding method according to Embodiment 1 of the present invention.

The image coding method according to Embodiment 1 conforms to, for example, MPEG-4AVC standard.

As shown in FIG. 2, first, the block dividing unit 101 divides the input image 150 into block images 151 to be coded (hereinafter, referred to as "target blocks") (S101).

Next, the intra prediction unit 119 and the inter prediction unit 121 perform inter prediction and the intra prediction, respectively, on the block image 151 generated at Step S101 (S102). Furthermore, the intra/inter determination unit 123 selects an inter mode or an intra mode based on respective prediction results of the inter prediction and the intra prediction.

Next, the orthogonal transformation size selection unit 106 selects a 4 pixels×4 pixels size or a 8 pixels×8 pixels size for the target block (differential image 174) (S103).

If the 4 pixels×4 pixels size is selected at Step S103 (Yes at S104), then the first orthogonal transformation unit 109 performs 4 pixels×4 pixels orthogonal transformation on the differential image 174 to generate a transform coefficient 159 (S105).

Next, the first quantization unit 110 quantizes the transform coefficient 159 generated at Step S105 to generate a quantization coefficient 160 (S106).

On the other hand, if the 8 pixels×8 pixels size is selected at Step S103 (No at S104), then the second orthogonal transformation unit 111 performs 8 pixels×8 pixels orthogonal transformation on the differential image 174 to generate a transform coefficient 161 (S107).

Next, the second quantization unit 112 quantizes the transform coefficient 161 generated at Step S107 to generate a quantization coefficient 162 (S108).

Next, the entropy coding unit 114 codes the quantization coefficient 160 generated at Step S106 or the quantization coefficient 162 generated at Step S108 to generate a bitstream 164 (S109).

If all of the blocks have not been coded (No at S110), then the processing of Steps S101 to S110 is performed for a next block. On the other hand, if all of the blocks have already been coded (Yes at S110), then coding of one picture is completed.

Moreover, by using a selection method described below in Step S103, the following effects can be expected. The following describes Step S103 in more detail.

Figure 3:
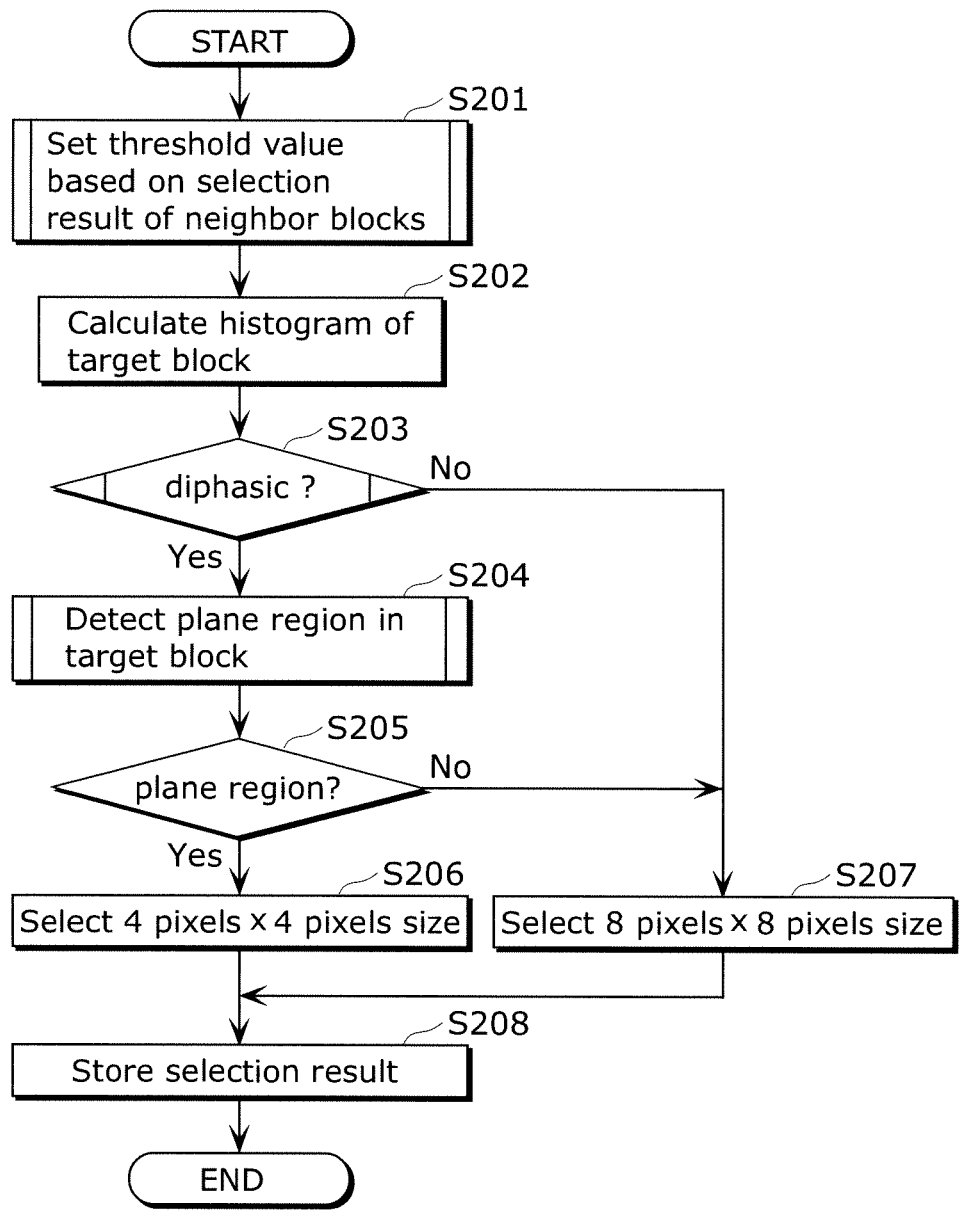
FIG. 3 is a flowchart of an orthogonal transformation size selection method according to Embodiment 1 of the present invention.

FIG. 3 is a flowchart of the orthogonal transformation size selection method (S103) according to Embodiment 1 of the present invention.

As shown in FIG. 3, first, the threshold value control unit 107 sets a threshold value based on information of neighbor blocks of the target block (S201).

Next, the histogram calculation unit 102 calculates a histogram 152 of pixels included in the target block (S202).

Next, the bimodal determination unit 103 determines, based on a threshold value set at Step S201, whether or not the histogram 152 calculated at Step S202 is bimodal (S203).

If it is determined that the histogram 152 is bimodal (Yes at S203), then the plane region detection unit 104 detects, from the target block, a size of a plane region in which the pixel values smoothly vary (S204).

Next, based on plane region information 154 that is the detection result obtained at Step S204, the plane region determination unit 105 determines whether or not the target block includes a plane region (S205).

If it is determined that the plane region is included (Yes at S205), then the orthogonal transformation size selection unit 106 selects the 4 pixels×4 pixels size as the orthogonal transformation size (S206).

On the other hand, if it is determined that the histogram 152 is not bimodal (No at S203), and if it is determined that the target block does not include a plane region (No at S205), the orthogonal transformation size selection unit 106 selects the 8 pixels×8 pixels size as the orthogonal transformation size (S207).

Next, the threshold value control unit 107 stores selection information that indicates which of the 4 pixels×4 pixels size and the 8 pixels×8 pixels size has been selected by the orthogonal transformation size selection unit 106 (S208).

Figure 4A:
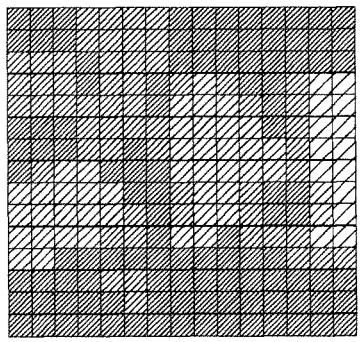
FIG. 4A is a diagram showing an example of a natural image according to Embodiment 1 of the present invention.
Figure 4B:
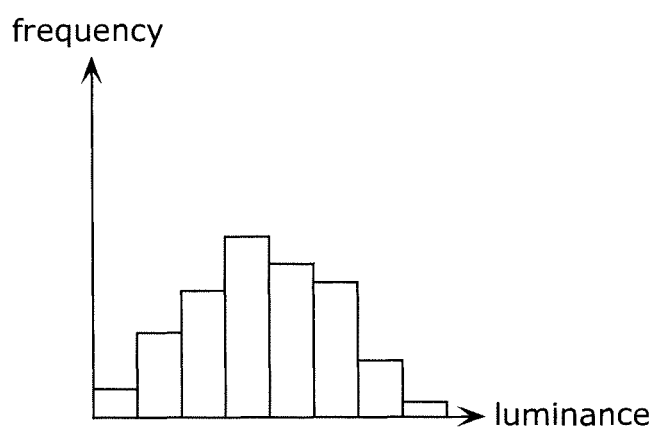
FIG. 4B is a graph showing an example of a luminance histogram of a natural image according to Embodiment 1 of the present invention.

FIG. 4A is a diagram showing an example of a natural image. FIG. 4B is a graph showing a luminance histogram of the natural image shown in FIG. 4A. As shown in FIG. 4A, the luminance histogram of the natural image shows monomodal distribution having a single mountain (crest).

Figure 4C:
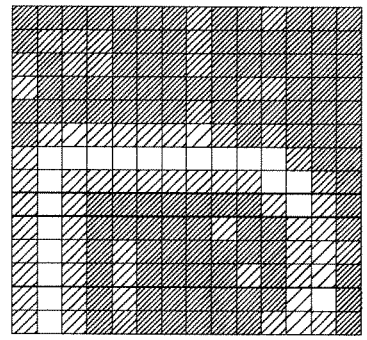
FIG. 4C is a diagram showing an example of an image including a character according to Embodiment 1 of the present invention.
Figure 4D:
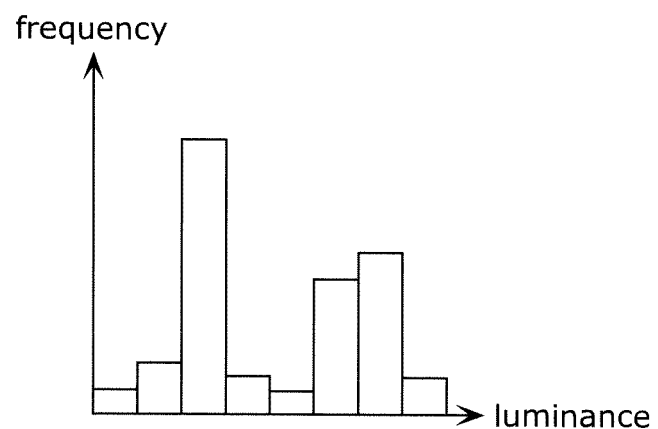
FIG. 4D is a graph showing an example of a luminance histogram of an image including a character according to Embodiment 1 of the present invention.

FIG. 4C is a diagram showing an example of block images including a character. FIG. 4D is a graph showing a luminance histogram of the image shown in FIG. 4C. As shown in FIG. 4D, the image including a character shows bimodal distribution having two mountains (crests).

As described above, a character causes bimodal distribution in a luminance histogram. However, an image where luminance variations are diffused, which is represented by a checkered pattern image, has a bimodal luminance histogram. In other words, even if a luminance histogram is bimodal, the image may not include a character. In addition, a character generally has a plane part in its character portion or background portion, in order to make the character portion legible. Therefore, in the orthogonal transformation size selection method according to Embodiment 1 of the present invention, first, it is determined whether or not there is a plane region, and then if it is determined that a histogram is bimodal and also that there is a plane region, it is determined that there is a character.

The following describes each of Steps shown in FIG. 3. First, Steps S202 to S205 and S208 are described, and at last Step S201 is described. Steps S206 and S207 are not described because they are obvious processes.

At Step S202, the histogram calculation unit 102 calculates a luminance histogram 152 of the target block. Here, although various methods are possible for luminance class dividing, it is assumed in the following description that 0 to 225 are divided into 8 classes. More specifically, the 0-th class contains 0 to 31, the first class contains 32 to 63, . . . , the seventh class contains 222 to 225.

Here, the histogram 152 calculated by the histogram calculation unit 102 may be chrominance (Cb, Cr), each color of RGB, or a combination of them. However, it is desirable that the histogram calculation unit 102 extracts fluctuations (a portion with low luminance, such as red color) which a human especially easily perceives, so as to calculate the histogram 152.

The class division for the histogram 152 may have three or more classes. However, it is desirable to perform division on powers of 2 to achieve high-speed processing.

At Step S203, the bimodal determination unit 103 determines whether or not the histogram 152 calculated at Step S202 is bimodal. In order to determine whether or not the histogram 152 is bimodal, the bimodal determination unit 103 needs to determine how many mountains are included in the histogram. Therefore, the bimodal determination unit 103 uses a mountain determination threshold value MountTh (third threshold value) to determine whether or not there is a mountain.

Figure 5:
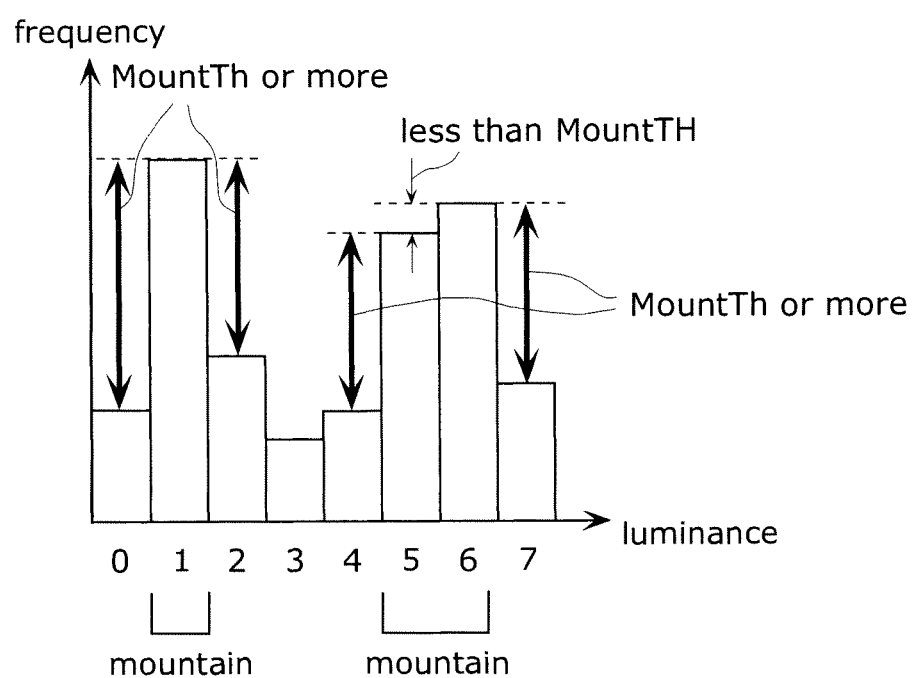
FIG. 5 is a graph showing a mountain detection method using a mountain determination threshold value according to Embodiment 1 of the present invention.

FIG. 5 is a graph showing a method of detecting mountains using the mountain determination threshold value. A horizontal axis in FIG. 5 indicates luminance classes. Regarding the classes, a luminance is divided into 8 classes. A vertical axis in FIG. 5 indicates a frequency of a luminance value in each class.

The bimodal determination unit 103 compares a difference in a frequency between the classes. If the frequency difference is equal to or greater than the mountain determination threshold value MountTh, the bimodal determination unit 103 determines that the classes have a shape of a mountain. For example, in FIG. 5, since the frequency of the first class is much greater than MountTh in comparison to the 0-th and second classes between the first class, it is determined that the classes form a mountain. On the other hand, a difference between classes is less than MountTh, it is determined that a plane continues. For example, since the frequency difference between the fifth class and the sixth class is less than MountTh, it is determined that the mountain continues. Furthermore, since the frequency difference between the sixth class and the seventh class is equal to or greater than MountTh, it is determined that the mountain part ends and another mountain is formed by the fifth and sixth classes. If it is determined that there are two mountains by the above-described method, the bimodal determination unit 103 determines that the histogram 152 is bimodal.

Figure 6:
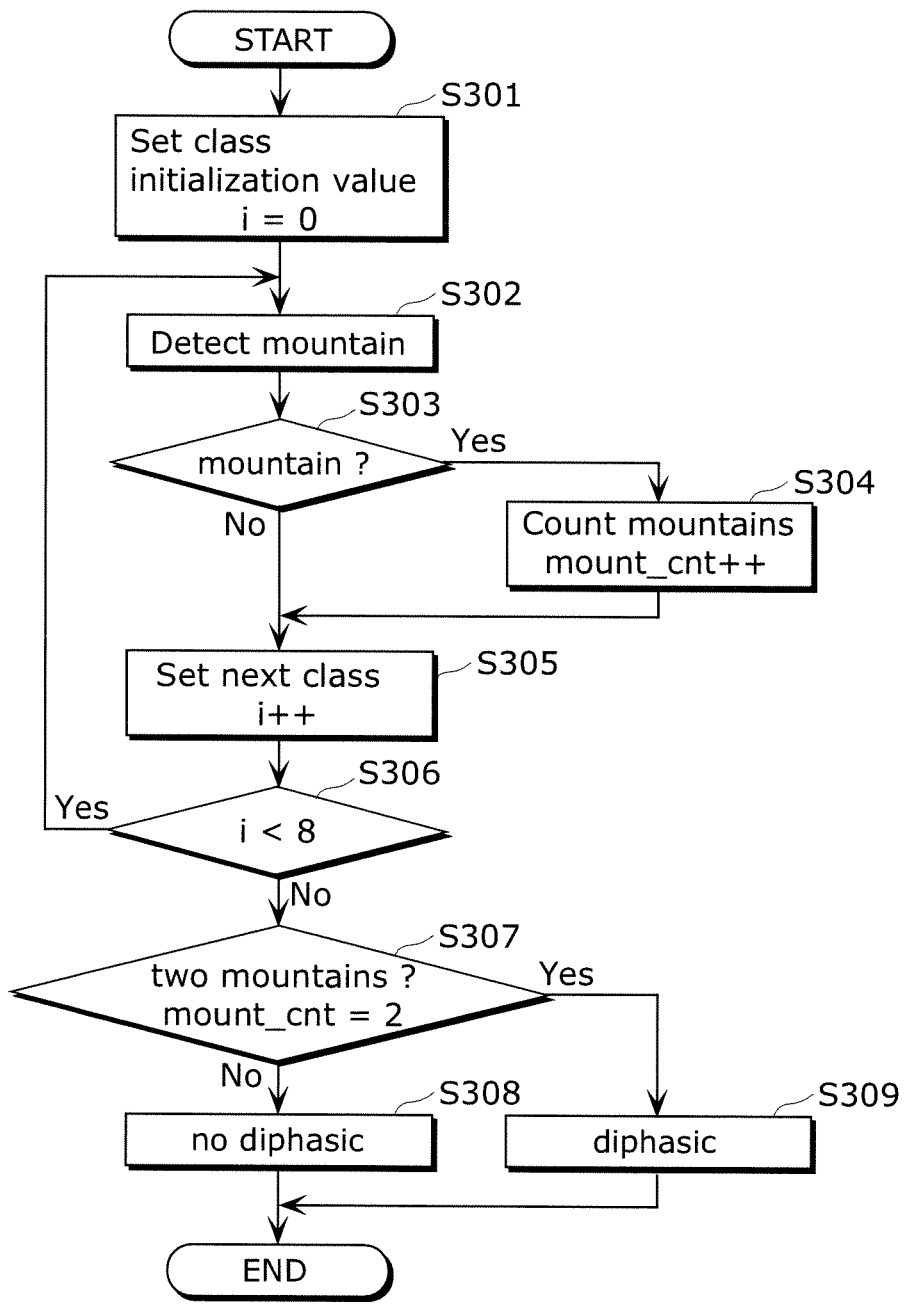
FIG. 6 is a flowchart of a bimodal determination method according to Embodiment 1 of the present invention.

FIG. 6 is a flowchart of the bimodal determination method (S203) by the bimodal determination unit 103.

First, the bimodal determination unit 103 sets an initial value of a target class (S301). For example, the bimodal determination unit 103 sets a target class i to be 0.

Next, the bimodal determination unit 103 detects whether or not there is a mountain in the class (S302).

If a mountain is detected at Step S302 (Yes at S303), then the bimodal determination unit 103 increments the number of mountains Mount_cnt by 1 (S304).

On the other hand, if no mountain is detected at Step S302 (No at S303), or after Step S304, then the bimodal determination unit 103 sets a target class to a next class (S305). For example, the bimodal determination unit 103 increments the target class i by 1.

Next, the bimodal determination unit 103 determines whether or not the mountain detection has been performed on all of the classes (Steps S302 to S305) (whether or not the target class i is smaller than 8) (S306).

If the mountain detection has not yet been completed for all of the classes (Yes at S306), then the bimodal determination unit 103 performs the processing from Steps S302 to S306 again for a next class.

On the other hand, if the mountain detection has already been completed for all of the classes (No at S306), the bimodal determination unit 103 determines whether or not a sum of the mountains detected at Step S304, namely, the number of mountains mount_cnt is 2 (S307).

If the number of mountains mount_cnt is not 2 (No at S307), then the bimodal determination unit 103 determines that there is no bimodal (S308). On the other hand, if the number of mountains mount_cnt is 2 (Yes at S307), then the bimodal determination unit 103 determines that the histogram is bimodal (S309).

Although in Embodiment 1 the above method has been described as the method of determining bimodal distribution, the bimodal determination method according to the present invention is not limited to the above. For example, the bimodal determination unit 103 may determine bimodal distribution based on diffusion or an average value.

Figure 7A:
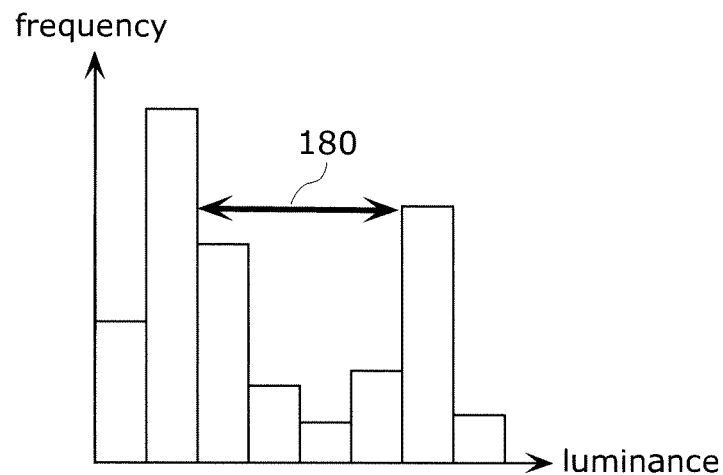
FIG. 7A is a graph showing an example of a bimodal threshold value according to Embodiment 1 of the present invention.
Figure 7B:
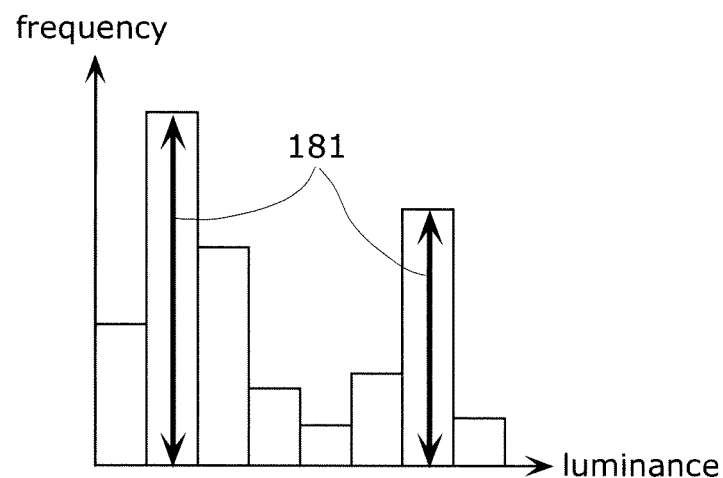
FIG. 7B is a graph showing an example of a bimodal threshold value according to Embodiment 1 of the present invention.

It has been described above that the bimodal determination unit 103 uses only the mountain determination threshold value MountTh as a threshold value to determine a mountain. However, the bimodal determination unit 103 may calculate, at Step S302, at least one of a difference 180 between the mountains shown in FIG. 7A and a height 181 of the mountain shown in FIG. 7B, and use them as threshold values for the mountain determination.

Furthermore, although it has been described above that the bimodal determination unit 103 determines at Step S307 whether or not there are two mountains, it is also possible to determine whether or not there are two or more mountains (the number of mountains mount_cnt is equal to or two).

Referring back to FIG. 3, the description continues.

At Step S204, the plane region detection unit 104 detects a plane part where values of pixels included in the target block are smoothly varied. One of methods for detecting such a plane part is a method of using an absolute differential value between adjacent pixels in the same manner as the edge detection.

More specifically, the plane region detection unit 104 calculates an absolute differential value of adjacent pixels. If the calculated absolute differential value is less than a predetermined plane threshold value Plane_Thr (second threshold value), the plane region detection unit 104 determines that there is a plane part between adjacent pixels. In addition, the plane region detection unit 104 counts a plane part count Plane_Cnt that is the number of plane parts. Moreover, the plane region detection unit 104 outputs the resulting plane part count Plane_Cnt as plane region information 154 indicating a size of a plane region.

The following describes the plane region detection (S204) performed by the plane region detection unit 104 in more detail.

The plane region detection includes plane part detection in a horizontal direction and plane part in a vertical direction. In the following description, a target pixel in the adjacent pixel calculation is expressed as $x(i, j)$.

Figure 8:
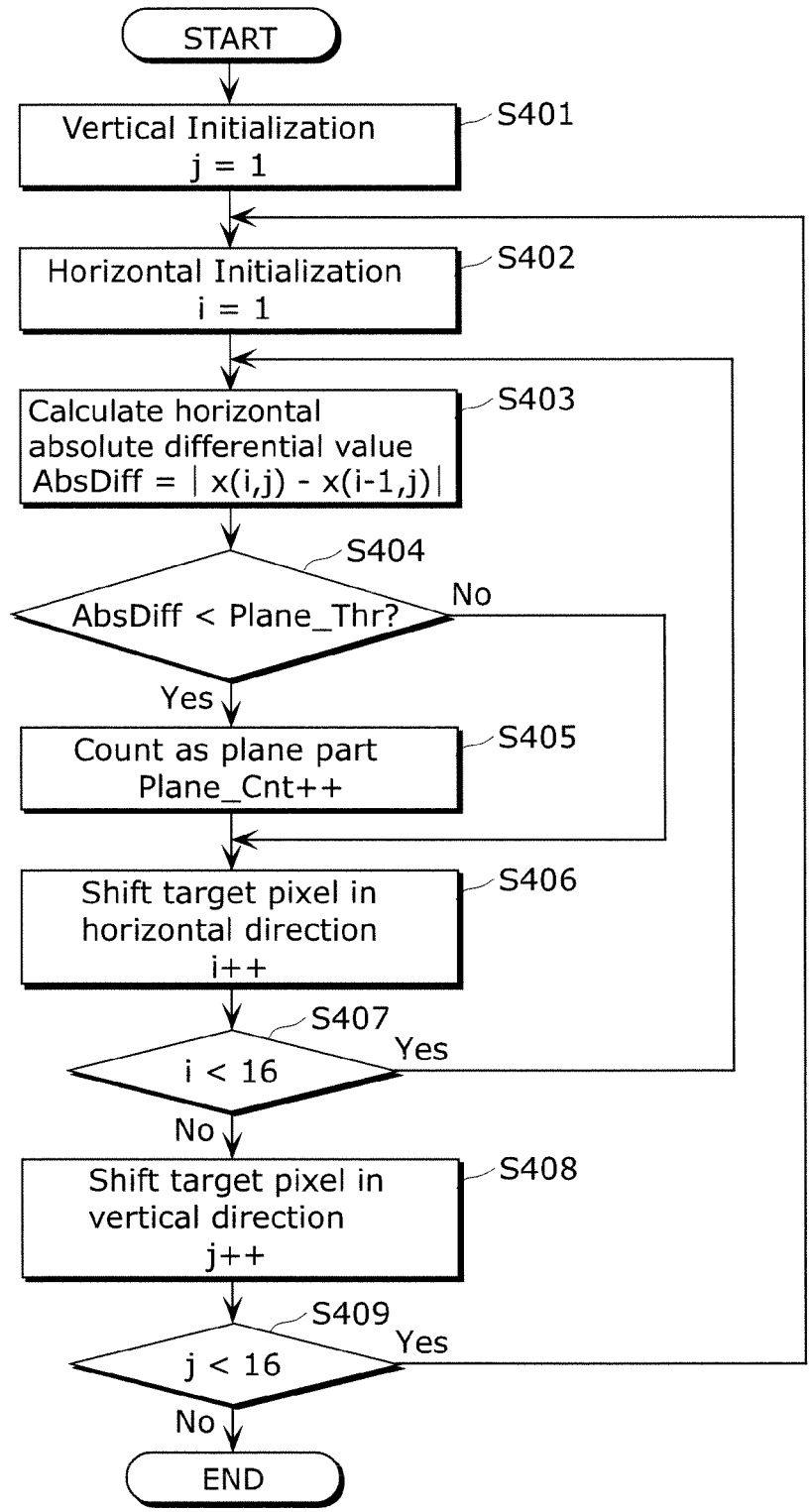
FIG. 8 is a flowchart of a plane part detection method in a horizontal direction according to Embodiment 1 of the present invention.

FIG. 8 is a flowchart of the plane part detection in a horizontal direction.

First, the plane region detection unit 104 performs initialization of a pixel position in a vertical direction (S401) and initialization of a pixel position in a horizontal direction (S402). For example, the plane region detection unit 104 sets a target pixel as $x(1, 1)$.

Next, the plane region detection unit 104 calculates an absolute differential value AbsDiff $(=|x(i, j)-x(i-1, j)|)$ in a horizontal direction (Step S403).

Next, the plane region detection unit 104 compares the calculated absolute differential value AbsDiff to the plane threshold value Plane_Thr (S404).

If the absolute differential value AbsDiff is smaller than the plane threshold value Plane_Thr (Yes at S404), then the plane region detection unit 104 increments the plane part count Plane_Cnt by 1 (S405).

After Step S405, or if the absolute differential value AbsDiff is greater than the plane threshold value Plane_Thr (No at S404), then the plane region detection unit 104 shifts the target pixel by one pixel in a horizontal direction (S406). More specifically, the plane region detection unit 104 increments a horizontal component i by 1.

Next, the plane region detection unit 104 determines whether or not the horizontal component i is smaller than 16 that is a macroblock size (size of a block image 151) in a horizontal direction (S407).

If the horizontal component i is smaller than 16 (Yes at S407), then the plane region detection unit 104 performs the processing from Step S403 again. More specifically, the plane region detection unit 104 performs plane part counting (S403 to S406) in a horizontal direction, on pixels in one row at Steps S402 to S407.

On the other hand, if the horizontal component i is 16 (No at S407), then the plane region detection unit 104 shifts the target pixel by 1 in a vertical direction (S408). More specifically, the plane region detection unit 104 increments a vertical component j by 1.

Next, the plane region detection unit 104 determines whether or not the vertical component j is smaller than 16 that is a macroblock size in a vertical direction (S409).

If the vertical component j is smaller than 16 (Yes at S409), then the plane region detection unit 104 performs the processing from Step S402 again. More specifically, the plane region detection unit 104 performs plane part counting (S403 to S406) in a horizontal direction, on all pixels included in the target block at Steps S401 to S409.

On the other hand, if the vertical component j is 16 (No at S409), then the plane region detection unit 104 performs plane part detection in a vertical direction.

Figure 9:
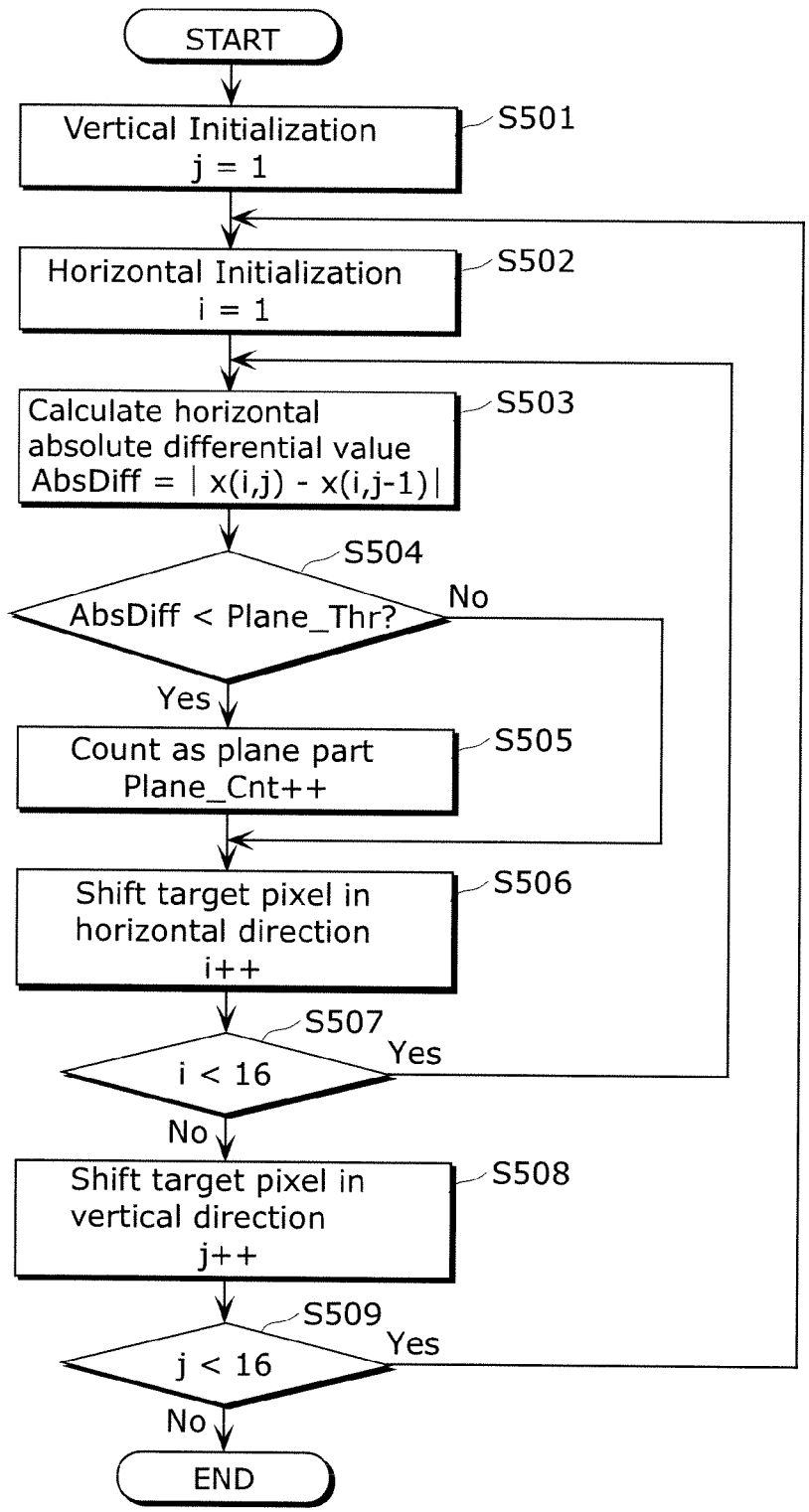
FIG. 9 is a flowchart of a plane part detection method in a vertical direction according to Embodiment 1 of the present invention.

FIG. 9 is a flowchart of the plane part detection in a vertical direction.

In the plane part detection in a vertical direction, the plane region detection unit 104 performs Step S503 for calculating an absolute differential value AbsDiff $(=|x(i, j)-x(i, j-1)|)$ in a vertical direction, instead of Step S403 for calculating the absolute differential value in a horizontal direction in the horizontal direction plane region detection. It should be noted that the processing of Steps S501, S502, and S504 to S509 in FIG. 9 is identical to the processing of Steps S401, S402, and S404 to S409 in FIG. 8, so that the processing will not be described again below.

As described above, the plane region detection unit 104 performs plane part detection both in a horizontal direction and in a vertical direction, so as to calculate a plane part count Plane_Cnt that considers both in a horizontal direction and a vertical direction of a target block, as plane region information indicating a size of a plane region.

Referring back again to FIG. 3, the description continues.

If the plane part count Plane_Cnt is equal to or greater than the plane part count threshold value Plane_Cnt_Thr (first threshold value) at Step S204, then at Step S205, the plane region determination unit 105 determines that the target block includes a plane region (Yes at S205). On the other hand, if the plane part count Plane_Cnt is smaller than the plane part count threshold value Plane_Cnt_Thr, then the plane region determination unit 105 determines that the target block does not include a plane region (No at S205).

At Step S208, the threshold value control unit 107 stores, for each block, selection information indicating whether the orthogonal transformation size selection unit 106 selects a 4 pixels×4 pixels size of a 8 pixels×8 pixels size.

Figure 10A:
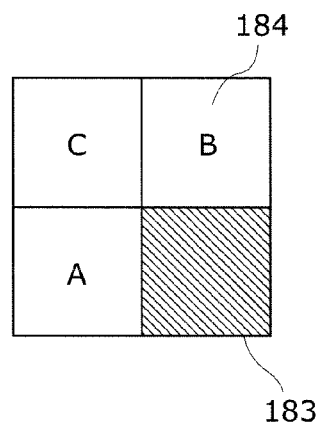
FIG. 10A is a diagram showing an example of reference blocks according to Embodiment 1 of the present invention.
Figure 10B:
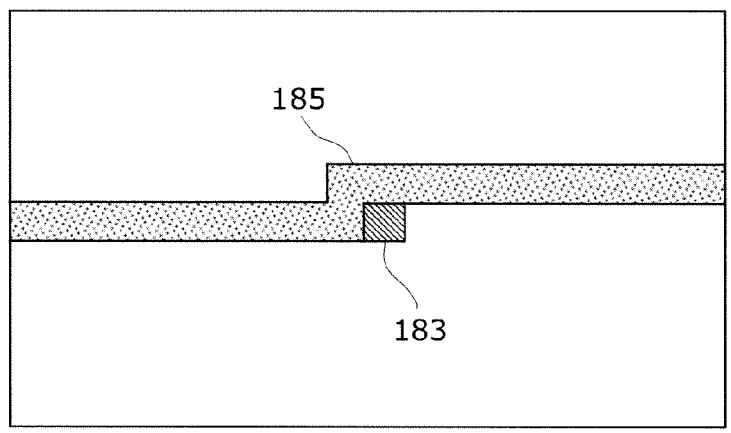
FIG. 10B is a diagram showing an example of a information storage target region according to Embodiment 1 of the present invention.

Here, the threshold value control unit 107 can store pieces of selection information of only neighbor blocks which are blocks to be processed subsequent to the target block. For example, in the present embodiment, the threshold value control unit 107, as shown in FIG. 10A, performs threshold value control for the target block 183 with reference to reference blocks 184 located at the left, above, and at the upper left of the target block 183. Therefore, in the case where the image coding device 100 sequentially processes blocks in a raster order from the upper left to the right, as shown in FIG. 10B, the threshold value control unit 107 stores at least pieces of selection information of blocks which are included in an information storage target region 185 from the adjacent block at the upper left of the target block 183 to the target block 183.

Although it has been described as an example that three neighbor blocks of the target block 183 are used, it is also possible to perform the threshold value control by using the arbitrary number of neighbor blocks among eight neighbor blocks. For example, the threshold value control unit 107 may use all of the eight neighbor blocks, a different combination of them, or only one of them.

Figure 11:
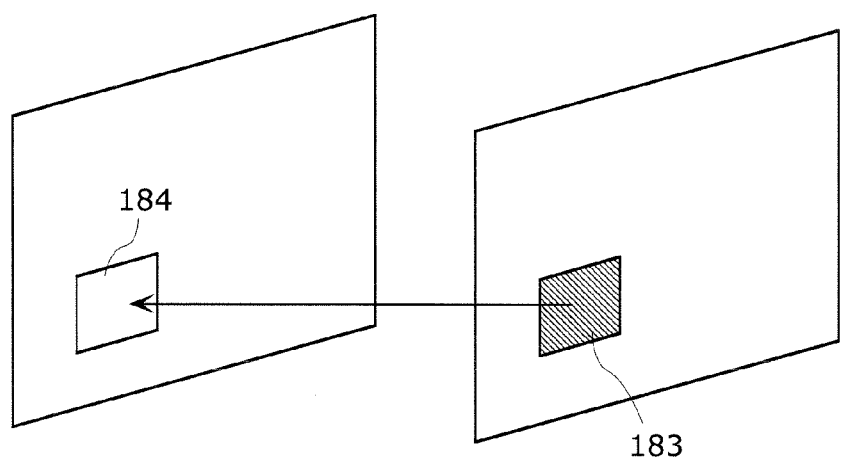
FIG. 11 is a diagram showing an example of a reference block according to Embodiment 1 of the present invention.

Here, a character has characteristics that it hardly moves in video. Based on the characteristics, the threshold value control unit 107 may further use, as selection information of a neighbor block, selection information of a reference block 184 included in a previous frame of the target block 183 as shown in FIG. 11. For example, the reference block 184 shown in FIG. 11 is a co-located block of the target block 183.

At Step S201, the threshold value control unit 107 controls a threshold value regarding the orthogonal transformation size selection, based on the selection information of the neighbor blocks. More specifically, when the neighbor block selection information indicates that the 4 pixels×4 pixels size is selected, the threshold value control unit 107 controls the orthogonal transformation size selection unit 106 to more likely to select the 4 pixels×4 pixels size than the 8 pixels×8 pixels size. On the other hand, when the neighbor block selection information indicates that the 8 pixels×8 pixels size is selected, the threshold value control unit 107 controls the orthogonal transformation size selection unit 106 to more likely to select the 8 pixels×8 pixels size than the 4 pixels×4 pixels size.

For example, the neighbor block selection information is selection information of reference blocks 184 (A, B, and C) shown in FIG. 10A. The threshold value controlled by the threshold value control unit 107 is the mountain determination threshold value MountTh shown in FIG. 5.

Figure 12:
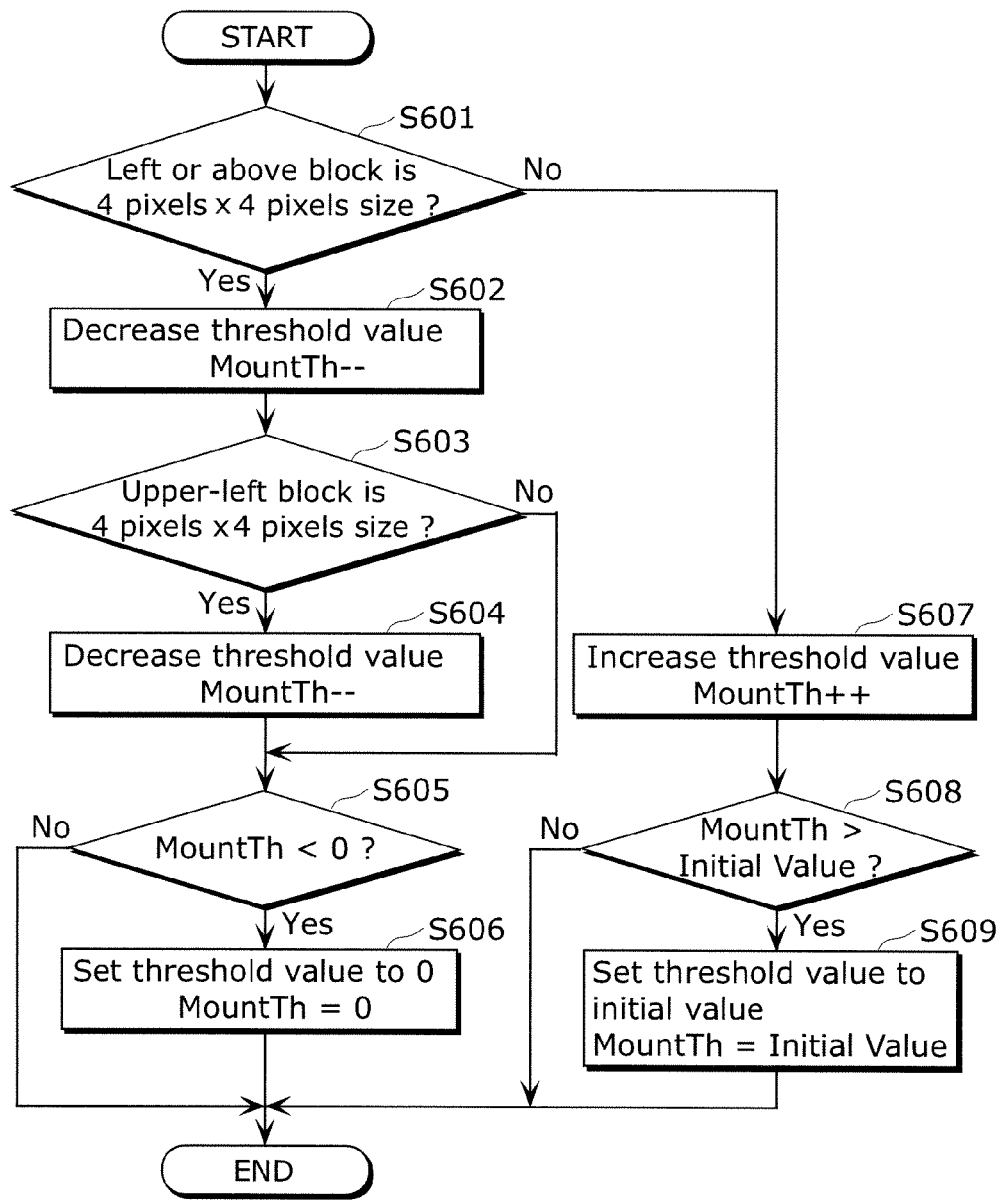
FIG. 12 is a flowchart of a threshold value control method according to Embodiment 1 of the present invention.

FIG. 12 is a flowchart of the threshold value control (Step S201).

First, the threshold value control unit 107 determines whether or not the 4 pixels×4 pixels size is selected for at least one of the neighbor block at the left of the target block 183 (reference block A) and the neighbor block above the target block 183 (reference block B) (S601).

If the 4 pixels×4 pixels size is selected for at least one of the neighbor block at the left of the target block 183 and the neighbor block above the target block 183 (Yes at S601), then the threshold value control unit 107 decrements the mountain determination threshold value MountTh by a predetermined value (S602).

Next, the threshold value control unit 107 determines whether or not the 4 pixels×4 pixels size is selected for the neighbor block at the upper left of the target block 183 (reference block C) (S603).

If the 4 pixels×4 pixels size is selected for the neighbor block at the upper left of the target block 183 (Yes at S603), the threshold value control unit 107 further decrements the mountain determination threshold value MountTh by the predetermined value (S604).

On the other hand, If the 4 pixels×4 pixels size is not selected for the neighbor block at the upper left of the target block 183 (No at S603), or after Step S604, the threshold value control unit 107 determines whether or not the mountain determination threshold value MountTh is equal to or smaller than 0 (S605).

If the mountain determination threshold value MountTh is smaller than 0 (Yes at S605), then the threshold value control unit 107 sets the mountain determination threshold value MountTh to 0 (S606).

On the other hand, if the 8 pixels×8 pixels size is selected for both of the neighbor block at the left of the target block 183 and the neighbor block above the target block 183 (No at S601), then the threshold value control unit 107 increments the mountain determination threshold value MountTh by the predetermined value (S607).

Next, the threshold value control unit 107 determines whether or not the mountain determination threshold value MountTh is greater than a threshold value (initial value) in the initialization (S608).

If the mountain determination threshold value MountTh is greater than the initial value (Yes at S608), then the threshold value control unit 107 initializes the mountain determination threshold value MountTh (S609).

On the other hand, if the mountain determination threshold value MountTh is equal to or greater than 0 (No at S605), if the mountain determination threshold value MountTh is equal to or less than the initial value (NO at S608), after Step S606, or after Step S609, the threshold value control unit 107 terminates the threshold value control for the target block 183.

It should be noted that the threshold value in the initialization is desirably set to be unlikely to select the 4 pixels×4 pixels size for target video.

Although it has been described that the threshold value control unit 107 controls the mountain determination threshold value MountTh, the threshold value control unit 107 may control other threshold values. For example, the threshold value control unit 107 may control a threshold value regarding the mountain difference 180 shown in FIG. 7A and a threshold value regarding the mountain height 181 shown in FIG. 7B. In addition, the threshold value control unit 107 may control the plane threshold value Plane_Thr or the plane part count threshold value Plane_Cnt_Thr. Moreover, the threshold value control unit 107 may control one of the these threshold values or a plurality of threshold values.

Figure 13A:
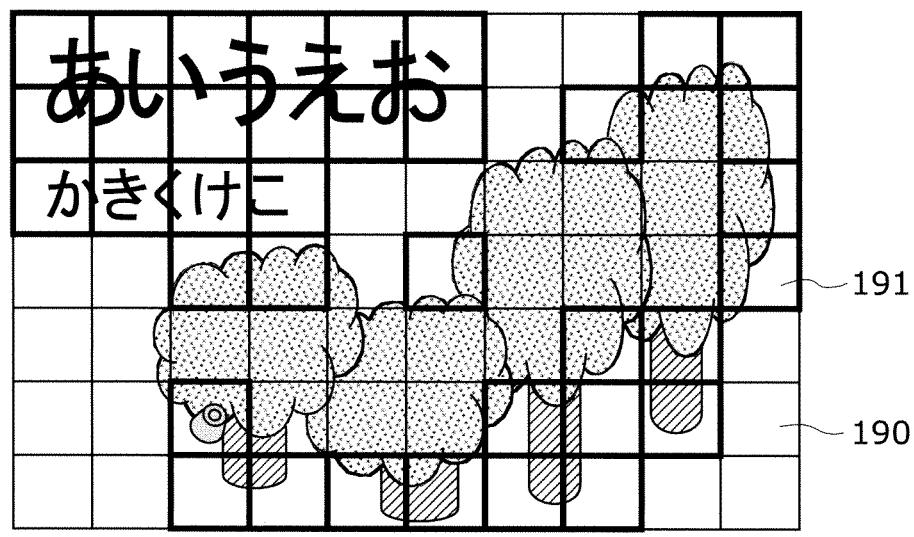
FIG. 13A shows a result of orthogonal transformation size selection performed by the image coding device according to Embodiment 1 of the present invention.
Figure 13B:
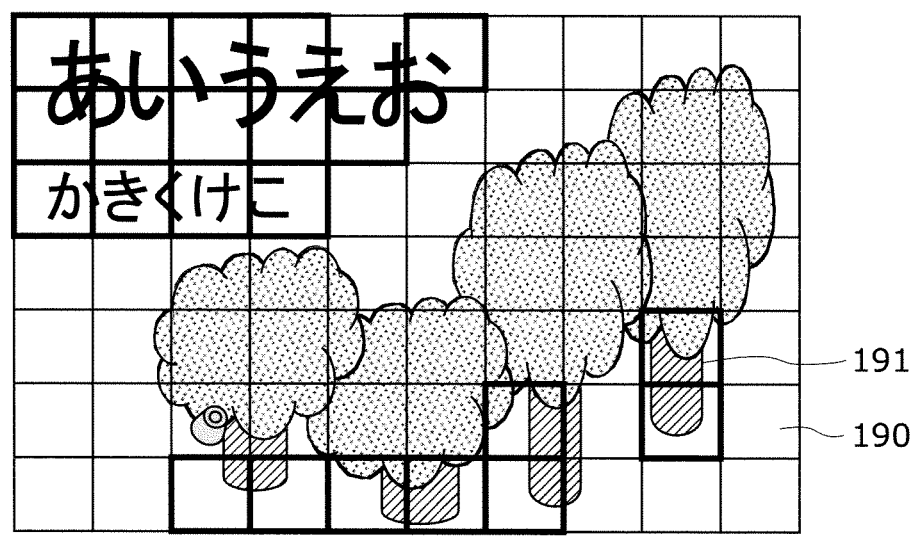
FIG. 13B shows a result of orthogonal transformation size selection performed by the image coding device according to Embodiment 1 of the present invention.

Each of FIGS. 13A and 13B shows a result of the orthogonal transformation size selection performed by the image coding device 100 according to Embodiment 1 of the present invention. More specifically, each of FIGS. 13A and 13B shows the selection result in the case where the threshold value control of the threshold value control unit 107 is not performed but a predetermined threshold value is used. In each of FIGS. 13A and 13B, blocks 191 shown by thick frames are blocks for which the 4 pixels×4 pixels size is selected, and the other blocks 190 are blocks for which the 8 pixels×8 pixels size is selected.

Figure 17A:
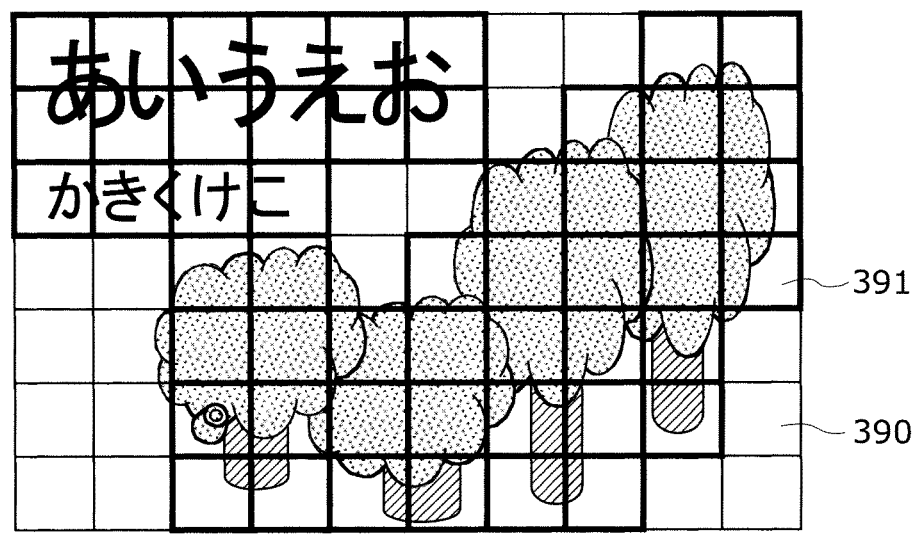
FIG. 17A shows a result of orthogonal transformation size selection using edge detection.

FIG. 13A is a diagram showing the selection result in the case where threshold value setting is performed to detect all of characters. In comparison to FIG. 17A, it is seen that the number of blocks 191 for which the 4 pixels×4 pixels size is selected in a forest part is decreased.

Figure 17B:
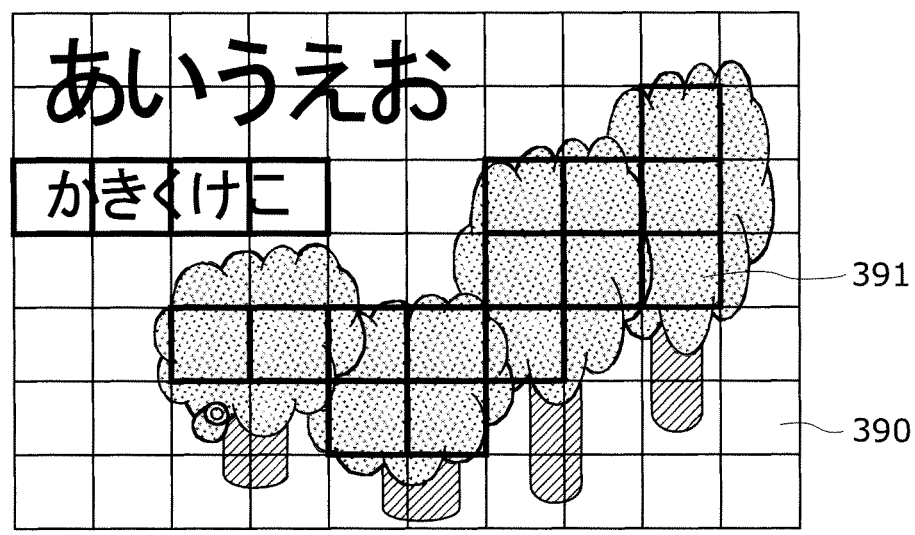
FIG. 17B shows a result of orthogonal transformation size selection using edge detection.

FIG. 13B is a diagram showing the selection result in the case where threshold value setting is performed to reduce the blocks 191 for which the 4 pixels×4 pixels size is selected. In comparison to FIG. 17B, it is seen that the 4 pixels×4 pixels size is selected also for the blocks including only a part of a character. Moreover, the 4 pixels×4 pixels size is not selected for the blocks, such as the forest, for which the 4 pixels×4 pixels size selection is not necessary.

Furthermore, the image coding device 100 according to Embodiment 1 of the present invention performs threshold value control by using the neighbor block selection result. Therefore, in FIG. 13B, the image coding device 100 can select the 4 pixels×4 pixels size for blocks for which the 4 pixels×4 pixels size selection is failed because the blocks include only a small part of a character.

FIG. 14 is a diagram showing an example of a block 300 for which the threshold value setting is difficult. If there is a part with sharp luminance in a block such as a block 300 in FIG. 14, the part may be a part of a character as shown in a lower-left block 303 in an image 301 in FIG. 14 or a highlighted part of a black object as shown in a lower-right block 304 in an image 302 in FIG. 14. It is not easy to determine such a block based on a certain threshold value.

In order to solve the above problem, the image coding device 100 according to Embodiment 1 of the present invention performs threshold value control by using the neighbor block selection result to select an appropriate orthogonal transformation size even in the above case.

Thus, the image coding device 100 and the image coding method according to Embodiment 1 of the present invention can select the 4 pixels×4 pixels size appropriately for character image in which mosquito nose is noticeable, and also be unlikely to select the 4 pixels×4 pixels size for blocks for which the selection is not necessary. As a result, the image coding device 100 and the image coding method can suppress increase of a coding amount. In addition, the image coding device 100 can suppress image quality deterioration caused by mosquito noise in a character image, thereby improving image quality.

Embodiment 2

In Embodiment 1, the threshold value control unit 107 stores the selection information indicating which of the 4 pixels×4 pixels size and the 8 pixels×8 pixels size is selected.

In Embodiment 2 of the present invention, in contrast, the threshold value control unit 107 stores a result of a determination as to whether or not a target block includes a character.

Figure 15:
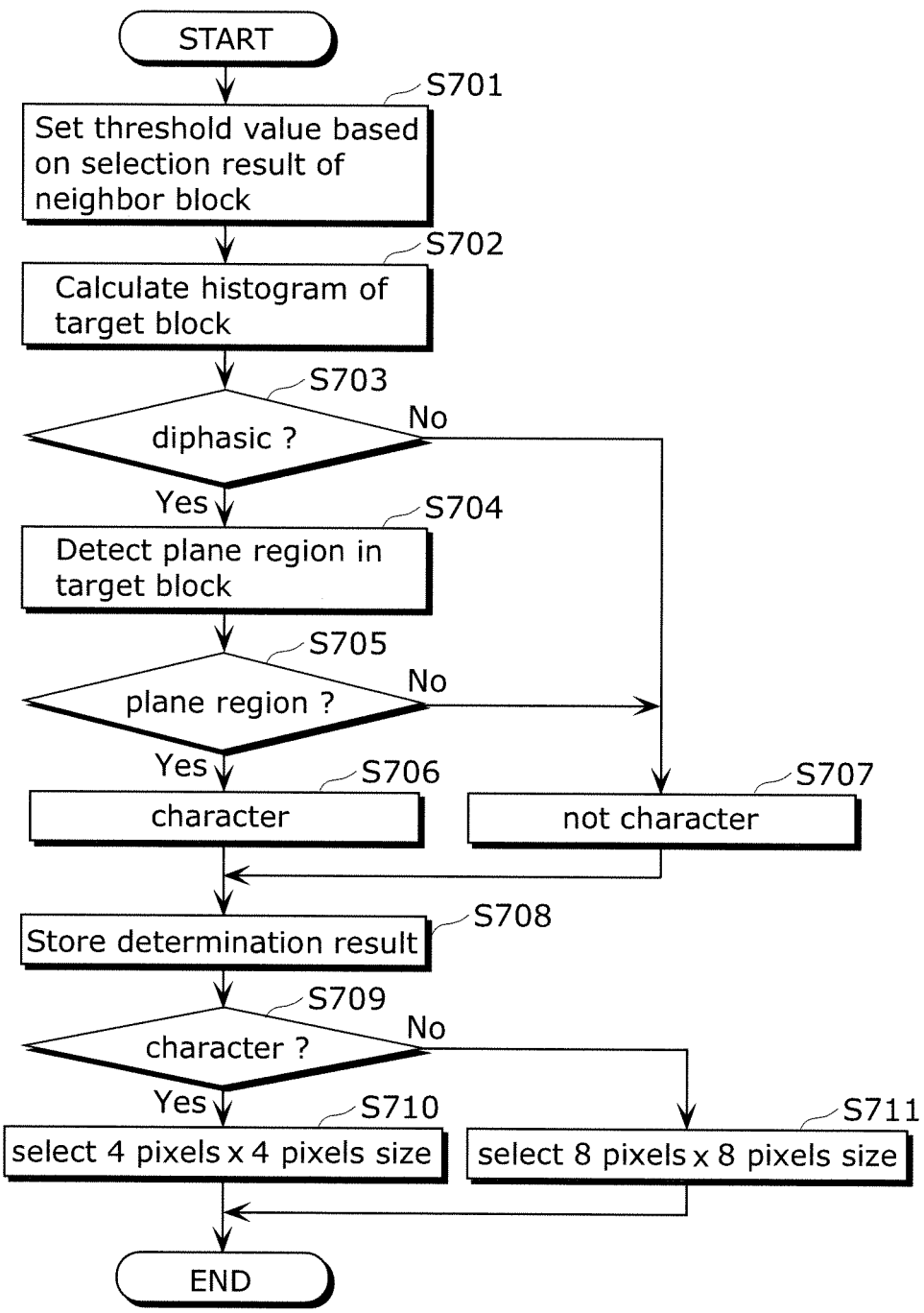
FIG. 15 is a flowchart of an image coding method according to Embodiment 2 of the present invention.

FIG. 15 is a flowchart of an orthogonal transformation size selection method (S103) according to Embodiment 2 of the present invention. It should be noted that the processing of Steps S702 to S705 is identical to the processing of Steps S202 to 205 in FIG. 3, so that the processing will not be described again below.

If it is determined that a plane region is included at Step S705 (Yes at S705), then the orthogonal transformation size selection unit 106 determines that the target block includes a character (S706).

On the other hand, if it is determined at S703 that a histogram 152 of the target block is not bimodal (No at S703) and it is determined at S705 that the target block does not include a plane region (No at S705), then the orthogonal transformation size selection unit 106 determines that the target block does not include a character part (S707).

Next, the threshold value control unit 107 stores character determination information indicating whether or not the target block includes a character part (S708).

If the target block includes a character part (Yes at S709), then the orthogonal transformation size selection unit 106 selects the 4 pixels×4 pixels size (S710). In addition, if the target block does not include a character part (No at S709), then the orthogonal transformation size selection unit 106 selects the 8 pixels×8 pixels size (S711).

At Step S701, the threshold value control unit 107 controls a threshold value to be used by the orthogonal transformation size selection unit 106, based on the character determination information of neighbor blocks. More specifically, when the character determination information of the neighbor blocks indicates that a character part is included in the target block, the threshold value control unit 107 controls the orthogonal transformation size selection unit 106 to be likely to select the 4 pixels×4 pixels size more than the 8 pixels×8 pixels size. More specifically, when the character determination information of the neighbor blocks indicates that a character part is not included in the target block, the threshold value control unit 107 controls the orthogonal transformation size selection unit 106 to be likely to select the 8 pixels×8 pixels size than the 4 pixels×4 pixels size. It should be noted that details of the threshold value control performed by the threshold value control unit 107 are the same as described in Embodiment 1, so that the threshold value control is not described again.

Thus, in the same manner as Embodiment 1, the image coding device 100 and the image coding method according to Embodiment 2 of the present invention can select the 4 pixels×4 pixels size more appropriately for character image or the like in which mosquito nose is noticeable, and also can be unlikely select the 4 pixels×4 pixels size for blocks for which the selection is not necessary. Thereby, the image coding device 100 and the image coding method can suppress increase of a coding amount. In addition, the image coding device 100 and the coding method can suppress image quality deterioration caused by mosquito noise in a character image, thereby improving image quality.

Embodiment 3

In Embodiment 3 of the present invention, the description is given for a imaging system 200 including the image coding device 100 according to the above-described Embodiment 1 or 2.

Figure 16:
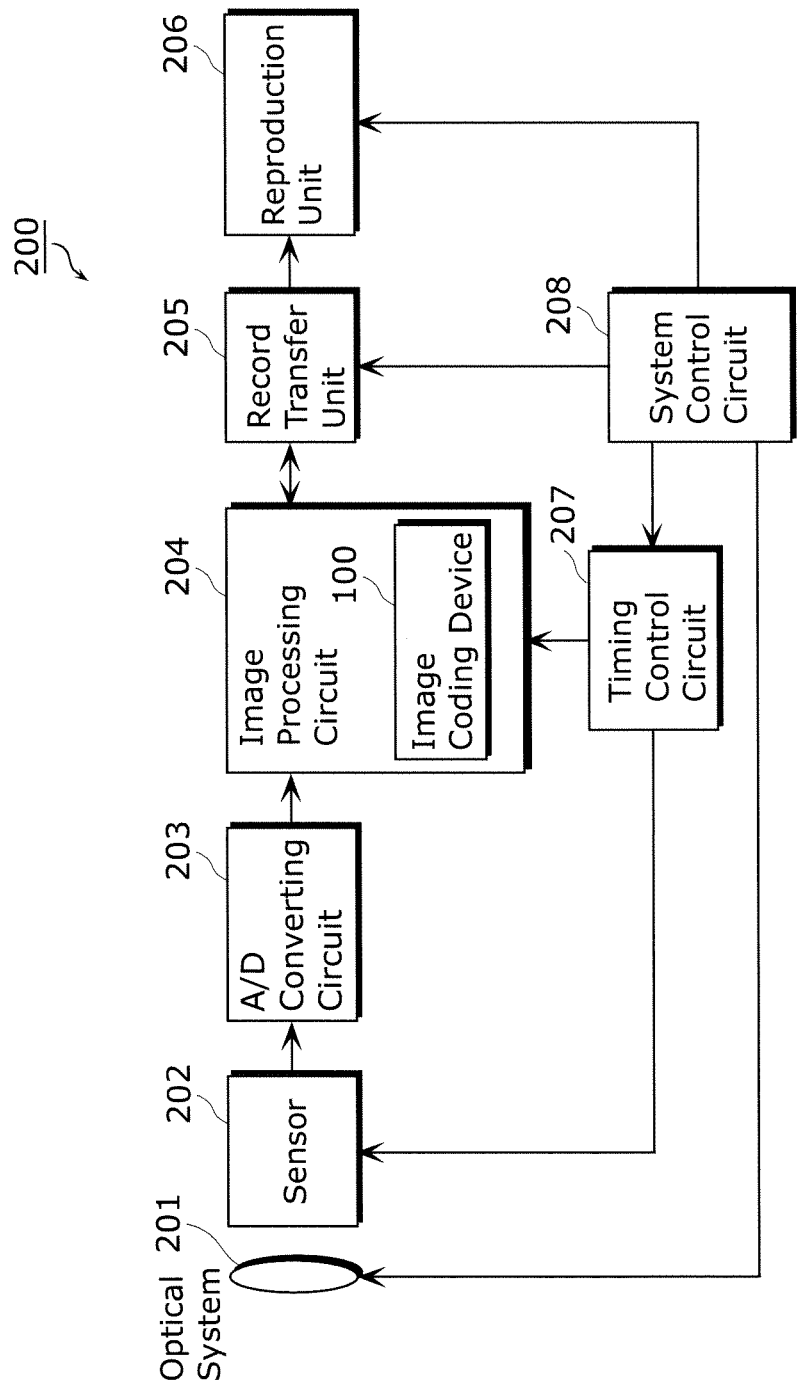
FIG. 16 is a block diagram of an imaging system according to Embodiment 3 of the present invention.

FIG. 16 is a block diagram showing a structure of the imaging system 200 according to Embodiment 3 of the present invention. The imaging system 200 is, for example, a digital still camera, a camera for a teleconference system, or the like.

The imaging system 200 shown in FIG. 16 includes an optical system 201, a sensor 202, an A/D converting circuit 203, an image processing circuit 204, a record transfer unit 205, a reproduction unit 206, a timing control circuit 207, and a system control circuit 208.

The optical system 201 forms an image of incident image light on the sensor 202.

The sensor 202 converts the image light formed by the optical system 201 into electric signals (image signals).

The A/D converting circuit 203 converts the electric signals (analog signals) generated by the sensor 202 into digital signals.

The image processing circuit 204 includes the image coding device according to the above-described Embodiment 1 or 2. The image processing circuit 204 performs Y/C processing, edge processing, image size increasing/decreasing, image compression/de-compression according to JPEG and MPEG, control of image compressed stream, and the like on the digital signals converted by the A/D converting circuit 203. In addition, the image coding device 100 codes the digital signals converted by the A/D converting circuit 203.

The record transfer unit 205 records the signals for which the image processing has been performed by the image processing circuit 204, onto a recording medium, or transfers the signals via the Internet or the like.

The reproduction unit 206 reproduces the signals which are recorded or transferred by the record transfer unit 205.

The timing control circuit 207 controls the sensor 202 and the image processing circuit 204.

The system control circuit 208 controls the optical system 201, the record transfer unit 205, the reproduction unit 206, and the timing control circuit 207.

It should be noted that it has been described that the image coding device 100 according to the present invention is applied to a camera or the like which coverts image light provided from the optical system 201 into electric signals by the sensor 202 and provides the resulting electric signals to the A/D converting circuit 203. However, of course, the image coding device 100 according to the present invention may be applied to other devices. For example, it is also possible that analog video input signals in an audio/visual device such as a television set are provided directly to the A/D converting circuit 203.

Although the image coding device, the image coding method, and the imaging system according to the embodiments of the present invention have been described, the present invention is not limited to these embodiments.

For example, although it as been described that the orthogonal transformation size is switched between the 4 pixels×4 pixels size and the 8 pixels×8 pixels size, it is also possible that the 4 pixels×4 pixels size is replaced by an arbitrary first processing size and the 8 pixels×8 pixels is replaced by the second processing size that is larger than the first processing size.

It should also be noted that the image coding device 100 according to the present embodiments is typically implemented into Large Scale Integrations (LSI) which are integral circuits. These may be integrated separately, or a part or all of them may be integrated into a single chip.

Here, the integrated circuit is referred to as a LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

It should also be noted that a part or all of functions of the image coding device 100 or the imaging system 200 according to the present embodiments may be implemented by executing a program by a processor such as a Central Processing Unit (CPU).

It should also be noted that the present invention may be the above-described program or a recording medium on which the above-described program is recorded. Of course, the above-described program can be distributed via a transfer medium such as the Internet.

It is also possible to combine at least part of the functions of the image coding devices according to the above-described Embodiments 1 and 2 and their variations.

It should also be noted that all of the numerals used in the above are examples for describing the present invention in more detail, and the present invention is not limited to these numerals.

It should also be noted that the order of executing steps included in the above-described image coding method is an example for describing the present invention in more detail, and may be different from the above. Moreover, a part of the steps may be executed together with another step at the same time (in parallel).

For example, it has been described, in FIGS. 3 and 15, that the flat region determination (S204 to S205, or S704 to S705) is performed after the bimodal determination (S202 to S203 or S702 to S703), but it is also possible that the bimodal determination is performed after the flat region determination or that parts of these determinations are performed at the same time.

Furthermore, those skilled in the art will be readily appreciated that various modifications of the embodiments are possible without materially departing from the novel teachings and advantages of the present invention.

INDUSTRIAL APPLICABILITY

The present invention can be applied to image coding devices and image coding methods. In particular, the present invention is useful as image coding devices for teleconference systems demanding high quality of character images.

The invention claimed is:

1. An image coding method of selecting a processing size of orthogonal transformation on a block-by-block basis and coding a target block by the selected processing size, the image coding method comprising:
calculating a histogram of pixel values included in a first target block included in an original image;
determining whether or not the calculated histogram is bimodal;
detecting a size of a plane region included in the first target block;
determining whether or not the detected size of the plane region is equal to or greater than a first threshold value; and selecting, as the processing size of the orthogonal transformation for the first target block, (i) a first processing size when it is determined that the histogram is bimodal and it is determined that the size of the plane region is equal to or greater than the first threshold value, and (ii) a second processing size greater than the first processing size when it is determined that the histogram is not bimodal or it is determined that the size of the plane region is smaller than the first threshold value.

2. The image coding method according to claim 1, wherein the detecting includes: (i) calculating, for each pair of pixels included in the first target block, an absolute differential value between a target pixel and each of adjacent pixels which are horizontally and vertically adjacent to the target pixel; and (ii) detecting, as the size of the plane region, a count of plane parts each having the absolute differential value smaller than a second threshold value.

3. The image coding method according to claim 1, further comprising:
storing selection information indicating which of the first processing size and the second processing size is selected for the first target block; and
controlling the selecting so that the first processing size is more likely to be selected for a second target block than the second processing size, when the stored selection information of a neighbor block of the second target block indicates that the first processing size is selected for the neighbor block.

4. The image coding method according to claim 3, wherein in the controlling, the selecting is controlled so that the second processing size is more likely to be selected than the first processing size, when the stored selection information of the neighbor block of the second target block indicates that the second processing size is selected for the neighbor block.

5. The image coding method according to claim 3, wherein the determining regarding the histogram includes: (i) detecting a mountain when a frequency difference between classes of the histogram is equal to or greater than a third threshold value; and (ii) determining that the histogram is bimodal when two or more mountains are detected.

6. The image coding method according to claim 5, wherein the controlling includes, when the selection information indicates that the first processing size is selected, decreasing the third threshold value to control the selecting so that the first processing size is more likely to be selected than the second processing size.

7. The image coding method according to claim 1, further comprising:
determining whether or not the first target block includes a character part, wherein (i) it is determined that the first target block includes the character part, when it is determined that the histogram is bimodal and it is determined that the size of the plane region is equal to or greater than the first threshold value, and (ii) it is determined that the first target block does not include the character part, when it is determined that the histogram is not bimodal or it is determined that the size of the plane region is smaller than the first threshold value; and
storing character determination information indicating whether or not it is determined that the first target block includes the character part,
wherein in the selecting, (i) the first processing size is selected as the processing size of the orthogonal transformation for the first target block, when it is determined that the first target block includes the character part; and (ii) the second processing size is selected as the processing size of the orthogonal transformation for the first target block, when it is determined that the first target block does not include the character part,
wherein the image coding method further comprises
controlling the selecting so that the first processing size is likely to be selected for a second target block, when the stored character determination information of a neighbor block of the second target block indicates that the neighbor block includes the character part.

8. The image coding method according to claim 3, wherein the neighbor block is at least one of eight blocks adjacent to the second target block.

9. The image coding method according to claim 3, wherein the neighbor block is co-located in a previous picture.

10. The image coding method according to claim 1, wherein in the calculating of the histogram, a histogram of luminance values of the first target block is calculated as the histogram.

11. The image coding method according to claim 1, wherein in the calculating of the histogram, a histogram of chrominance of the first target block is calculated as the histogram.

12. The image coding method according to claim 1, wherein the first processing size is 4 pixels×4 pixels, and the second processing size is 8 pixels×8 pixels.

13. The image coding method according to claim 1, wherein the plane region is a character part.

14. An image coding apparatus that selects a processing size of orthogonal transformation on a block-by-block basis and codes a target block by the selected processing size, the image coding apparatus comprising:
a histogram calculation unit configured to calculate a histogram of pixel values included in a first target block included in an original image;
a bimodal determination unit configured to determine whether or not the calculated histogram is bimodal;
a plane region detection unit configured to detect a size of a plane region included in the first target block;
a plane region determination unit configured to determine whether or not the detected size of the plane region is equal to or greater than a first threshold value; and
an orthogonal transformation size selection unit configured to select, as the processing size of the orthogonal transformation for the first target block, (i) a first processing size when the bimodal determination unit determines that the histogram is bimodal and the plane region determination determines that the size of the plane region is equal to or greater than the first threshold value, and (ii) a second processing size greater than the first processing size when the bimodal determination unit determines that the histogram is not bimodal or the plane region determination determines that the size of the plane region is smaller than the first threshold value.

15. The image coding apparatus according to claim 14, wherein the plane region is a character part.

16. An imaging system comprising:
an optical system which forms an image using light;
a sensor which converts the image formed by the optical system into image signals; and
an image processing circuit including:
a histogram calculation unit configured to calculate a histogram of pixel values included in a first target block included in an original image;

a bimodal determination unit configured to determine whether or not the calculated histogram is bimodal;

a plane region detection unit configured to detect a size of a plane region included in the first target block;

a plane region determination unit configured to determine whether or not the detected size of the plane region is equal to or greater than a first threshold value; and an orthogonal transformation size selection unit configured to select, as the processing size of the orthogonal transformation for the first target block, (i) a first processing size when the bimodal determination unit determines that the histogram is bimodal and the plane region determination determines that the size of the plane region is equal to or greater than the first threshold value, and (ii) a second processing size greater than the first processing size when the bimodal determination unit determines that the histogram is not bimodal or the plane region determination determines that the size of the plane region is smaller than the first threshold value.

17. The imaging system according to claim 16, wherein the plane region is a character part.

* * * * *